US010388162B2

(12) United States Patent
de Moura

(10) Patent No.: US 10,388,162 B2
(45) Date of Patent: Aug. 20, 2019

(54) SYSTEMS AND METHODS FOR UTILIZING MOBILE ACCESS POINTS AS FIXED ACCESS POINTS IN A NETWORK OF MOVING THINGS, FOR EXAMPLE INCLUDING AUTONOMOUS VEHICLES

(71) Applicant: Veniam, Inc., Mountain View, CA (US)

(72) Inventor: Daniel Cardoso de Moura, Gulpilhares (PT)

(73) Assignee: Veniam, Inc., Mountain View, CA (US)

( * ) Notice: Subject to any disclaimer, the term of this patent is extended or adjusted under 35 U.S.C. 154(b) by 0 days.

(21) Appl. No.: 15/789,778

(22) Filed: Oct. 20, 2017

(65) Prior Publication Data
US 2018/0211534 A1  Jul. 26, 2018

Related U.S. Application Data

(60) Provisional application No. 62/449,394, filed on Jan. 23, 2017.

(51) Int. Cl.
| G08G 1/133 | (2006.01) |
| H04W 4/04 | (2009.01) |
| G06Q 50/30 | (2012.01) |
| G08G 1/01 | (2006.01) |
| H04W 16/00 | (2009.01) |
| H04W 88/08 | (2009.01) |
| H04W 4/40 | (2018.01) |
| G06Q 30/02 | (2012.01) |
| H04L 29/08 | (2006.01) |
| H04W 84/00 | (2009.01) |

(52) U.S. Cl.
CPC ......... *G08G 1/133* (2013.01); *G06Q 30/0207* (2013.01); *G06Q 50/30* (2013.01); *G08G 1/0112* (2013.01); *G08G 1/0129* (2013.01); *H04W 4/046* (2013.01); *H04W 4/40* (2018.02); *H04W 16/00* (2013.01); *H04W 88/08* (2013.01); *H04L 67/12* (2013.01); *H04W 84/005* (2013.01)

(58) Field of Classification Search
None
See application file for complete search history.

(56) References Cited

U.S. PATENT DOCUMENTS

| 9,558,643 B2 * | 1/2017 | Inchausti | G08B 21/086 |
| 2011/0109482 A1 * | 5/2011 | Haran | H04L 12/1877 340/995.1 |
| 2011/0149872 A1 * | 6/2011 | Carroll | H04W 36/0011 370/328 |
| 2011/0156924 A1 * | 6/2011 | Nadeem | G08G 1/0104 340/905 |
| 2011/0213968 A1 * | 9/2011 | Zhang | H04L 63/20 713/158 |

(Continued)

*Primary Examiner* — Curtis J King
(74) *Attorney, Agent, or Firm* — McAndrews, Held & Malloy, Ltd.

(57) ABSTRACT

Systems and methods for utilizing mobile access points as fixed access points in a network of moving things, for example including autonomous vehicles. As non-limiting examples, various aspects of this disclosure provide systems and methods for strategically positioning mobile access points at fixed locations, for example to flexibly augment the capabilities of the vehicle communication network.

24 Claims, 14 Drawing Sheets

(56) References Cited

U.S. PATENT DOCUMENTS

| | | | |
|---|---|---|---|
| 2012/0134342 A1* | 5/2012 | Le | H04W 72/1252 370/336 |
| 2014/0032297 A1* | 1/2014 | Germann | G06Q 30/0226 705/14.26 |
| 2014/0354451 A1* | 12/2014 | Tonguz | G08G 1/096716 340/905 |
| 2015/0017997 A1* | 1/2015 | Pal | H04W 48/18 455/450 |
| 2015/0223080 A1* | 8/2015 | Pulleti | G05D 1/0219 455/446 |
| 2016/0150451 A1* | 5/2016 | Barreto De Miranda Sargento | H04W 36/14 370/332 |
| 2016/0219242 A1* | 7/2016 | Hu | B60R 1/00 |
| 2016/0249233 A1* | 8/2016 | Murray | B61L 27/0005 |
| 2016/0269356 A1* | 9/2016 | Basnayake | H04L 61/2015 |
| 2016/0309524 A1* | 10/2016 | Barreto De Miranda Sargento | H04W 76/10 |
| 2017/0150423 A1* | 5/2017 | Yang | G08G 1/096716 |
| 2017/0289254 A1* | 10/2017 | Dieckmann | H04L 67/12 |
| 2017/0307390 A1* | 10/2017 | Uyeki | H04L 67/18 |
| 2017/0331836 A1* | 11/2017 | De Souza Schwartz | H04L 63/123 |
| 2018/0004213 A1* | 1/2018 | Absmeier | H04W 4/70 |
| 2018/0184269 A1* | 6/2018 | Christoval | H04W 4/38 |
| 2018/0279066 A1* | 9/2018 | Dollinger | H04W 8/18 |

\* cited by examiner

SYSTEMS AND METHODS FOR UTILIZING MOBILE ACCESS POINTS AS FIXED ACCESS POINTS IN A NETWORK OF MOVING THINGS, FOR EXAMPLE INCLUDING AUTONOMOUS VEHICLES

CROSS-REFERENCE TO RELATED APPLICATIONS/INCORPORATION BY REFERENCE

This patent application makes reference to, claims priority to, and claims benefit from U.S. Provisional Application Ser. No. 62/449,394, titled "Systems and Methods for Utilizing Mobile Access Points as Fixed Access Points in a Network of Moving Things, for Example Including Autonomous Vehicles, filed Jan. 23, 2017.

The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. patent application Ser. No. 15/191,732, titled "Systems and Methods for Managing Mobility in a Network of Moving Things," filed on Jun. 24, 2016 and U.S. Provisional Application Ser. No. 62/222,098, titled "Systems and Methods for Managing Mobility in a Network of Moving Things," filed on Sep. 22, 2015; U.S. patent application Ser. No. 15/245,992, titled "Systems and Methods for Managing Connectivity in a Network of Moving Things," filed on Aug. 24, 2016 and U.S. Provisional Application Ser. No. 62/222,121, titled "Systems and Methods for Managing Connectivity in a Network of Moving Things," filed on Sep. 22, 2015, each of which is hereby incorporated herein by reference in its entirety for all purposes; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. patent application Ser. No. 15/352,979, titled "Systems and Methods for Managing Network Controllers and Their Network Interactions in a Network of Moving Things, for Example Including a Network of Autonomous Vehicles," filed on Nov. 16, 2016, and U.S. Provisional Patent Application Ser. No. 62/273,715, filed on Dec. 13, 2015, and titled "Systems and Methods for Managing Mobility Controllers and Their Network Interactions in a Network of Moving Things"; U.S. patent application Ser. No. 15/352,953, titled "Systems and Methods for Managing and Triggering Handovers of Mobile Access Points in a Network of Moving Things, for Example Including a Network of Autonomous Vehicles," filed on Nov. 16, 2016, which claims priority to U.S. Provisional Patent Application Ser. No. 62/281,432, filed on Jan. 21, 2016, and titled "Systems and Methods for Managing and Triggering Handovers of Mobile Access Points in a Network of Moving Things"; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," filed on Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current vehicle communication networks generally fail to fully utilize their inherent flexibility. As a non-limiting example, a vehicle communication may comprise mobile access points that may at times be deployed as fixed access points to meet current and/or anticipated networking needs. Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
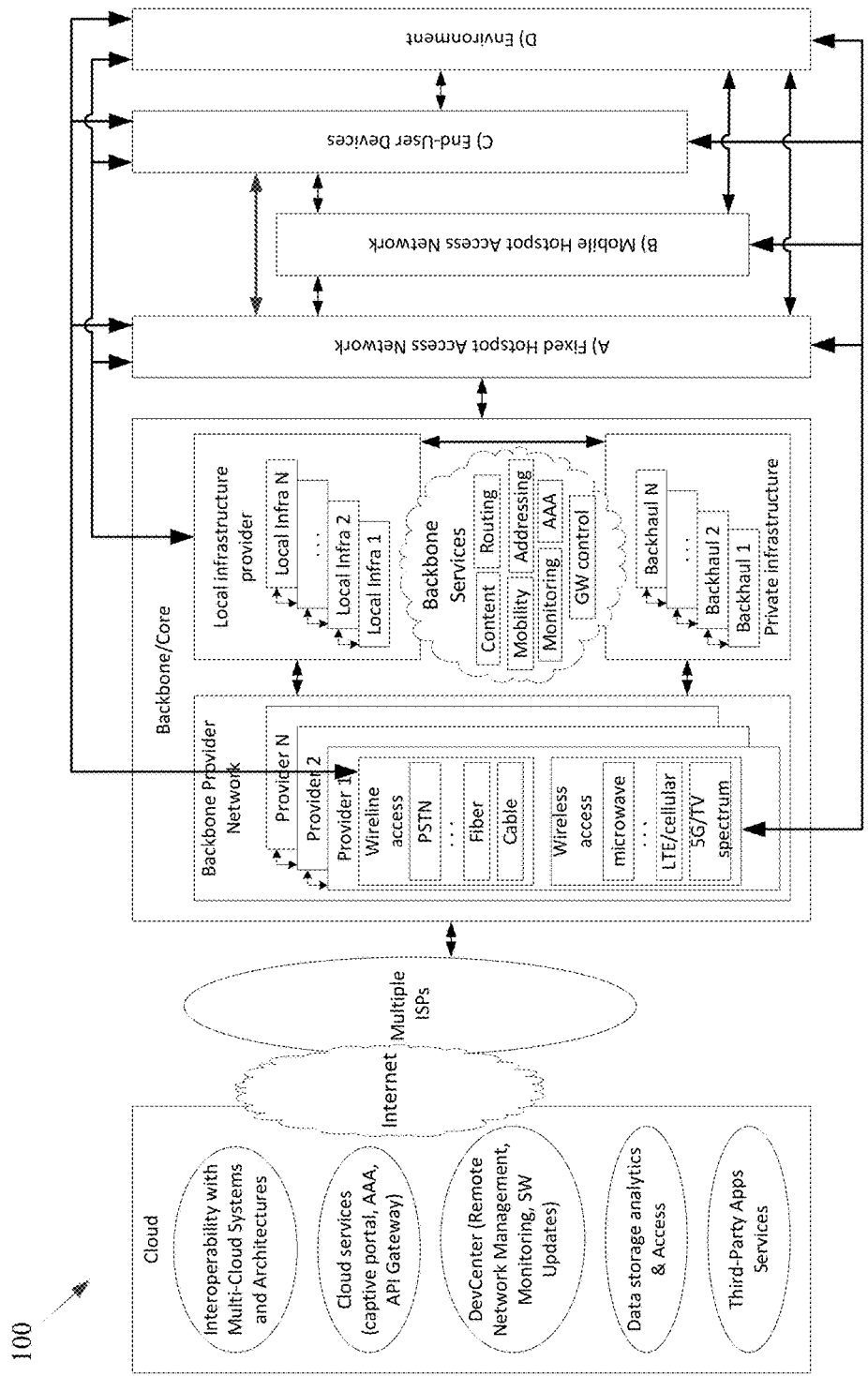
FIG. 1 shows a block diagram of a communication network, in accordance with various aspects of this disclosure.

Various aspects of this disclosure provide systems and methods for utilizing mobile access points as fixed access points in a network of moving things, for example including autonomous vehicles. As non-limiting examples, various aspects of this disclosure provide systems and methods for strategically positioning mobile access points at fixed locations, for example to flexibly augment the capabilities of the vehicle communication network.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, Fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10x the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. patent application Ser. No. 15/191,732, titled "Systems and Methods for Managing Mobility in a Network of Moving Things," filed on Jun. 24, 2016, which claims priority to U.S. Provisional Application Ser. No. 62/222,098, titled "Systems and Methods for Managing Mobility in a Network of Moving Things," filed on Sep. 22, 2015, each of which is hereby incorporated herein by reference in its entirety for all purposes. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or Fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, nodes, networks, and/or network components 200, 300, 400, 500-570, 600, 700, 800, 900, 1000, 1100, and 1200, shown and/or discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
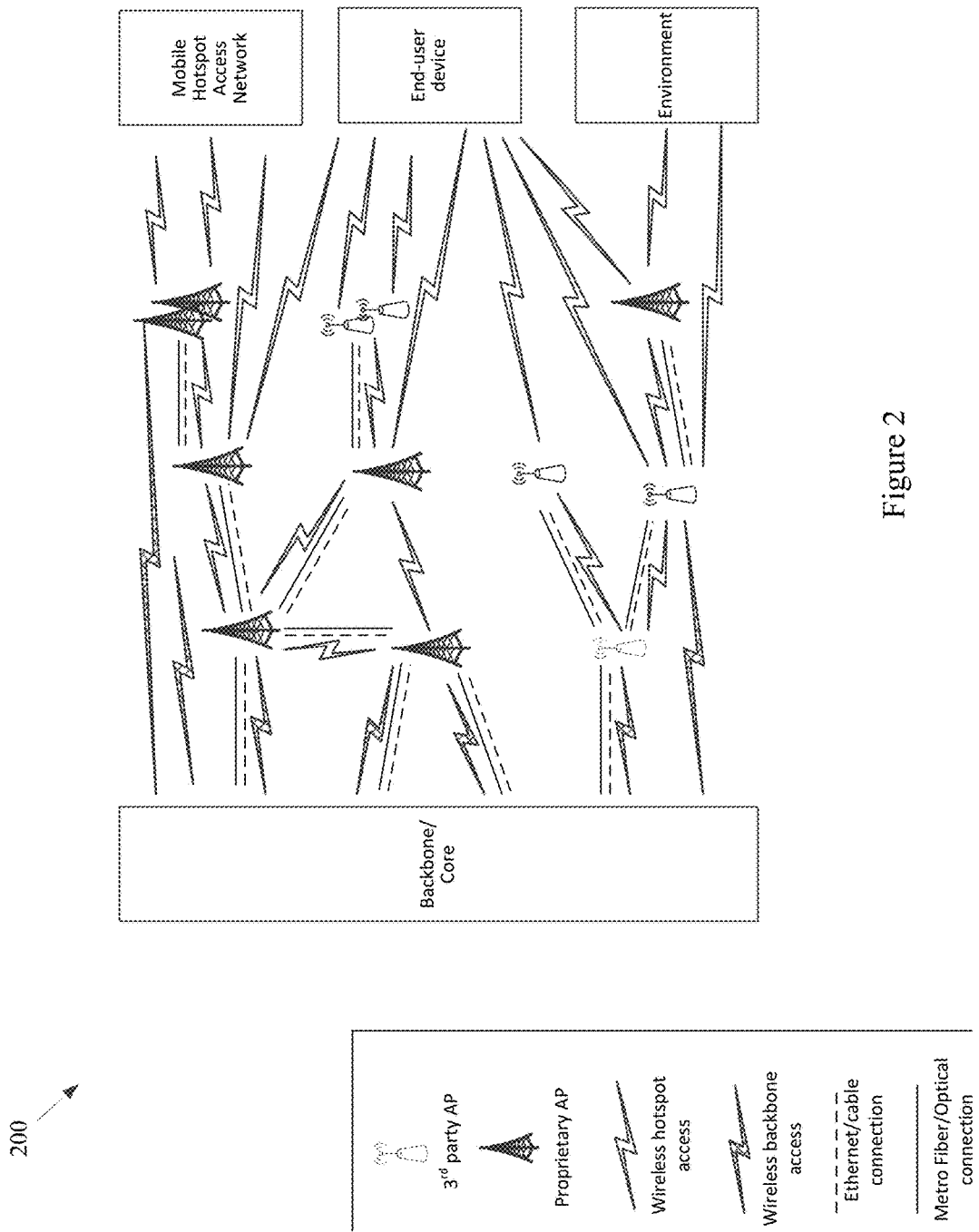
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, nodes, networks, and/or network components 100, 300, 400, 500-570, 600, 700, 800, 900, 1000, 1100, and 1200, shown and/or discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
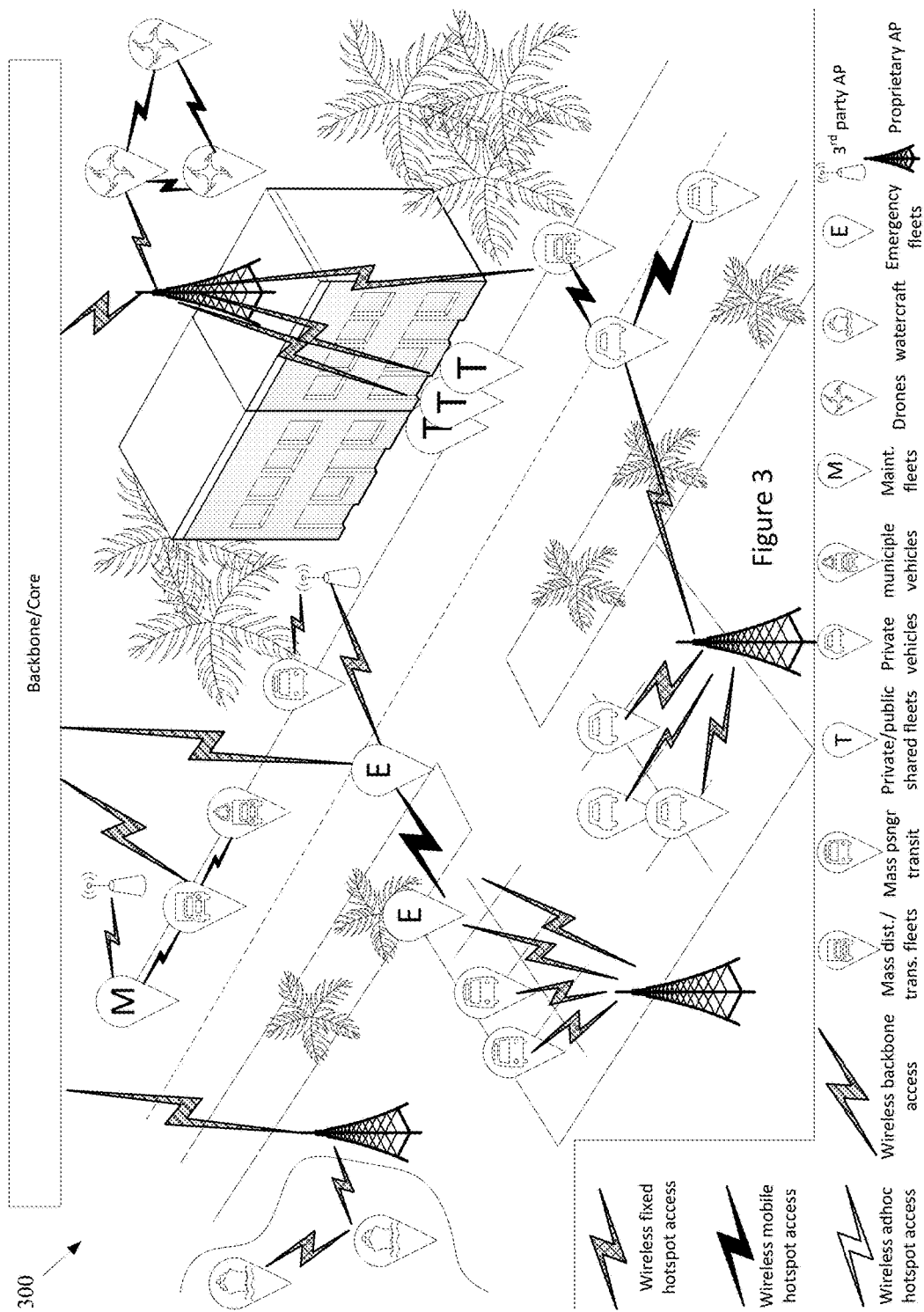
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, nodes, networks, and/or network components 100, 200, 400, 500-570, 600, 700, 800, 900, 1000, 1100, and 1200, shown and/or discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
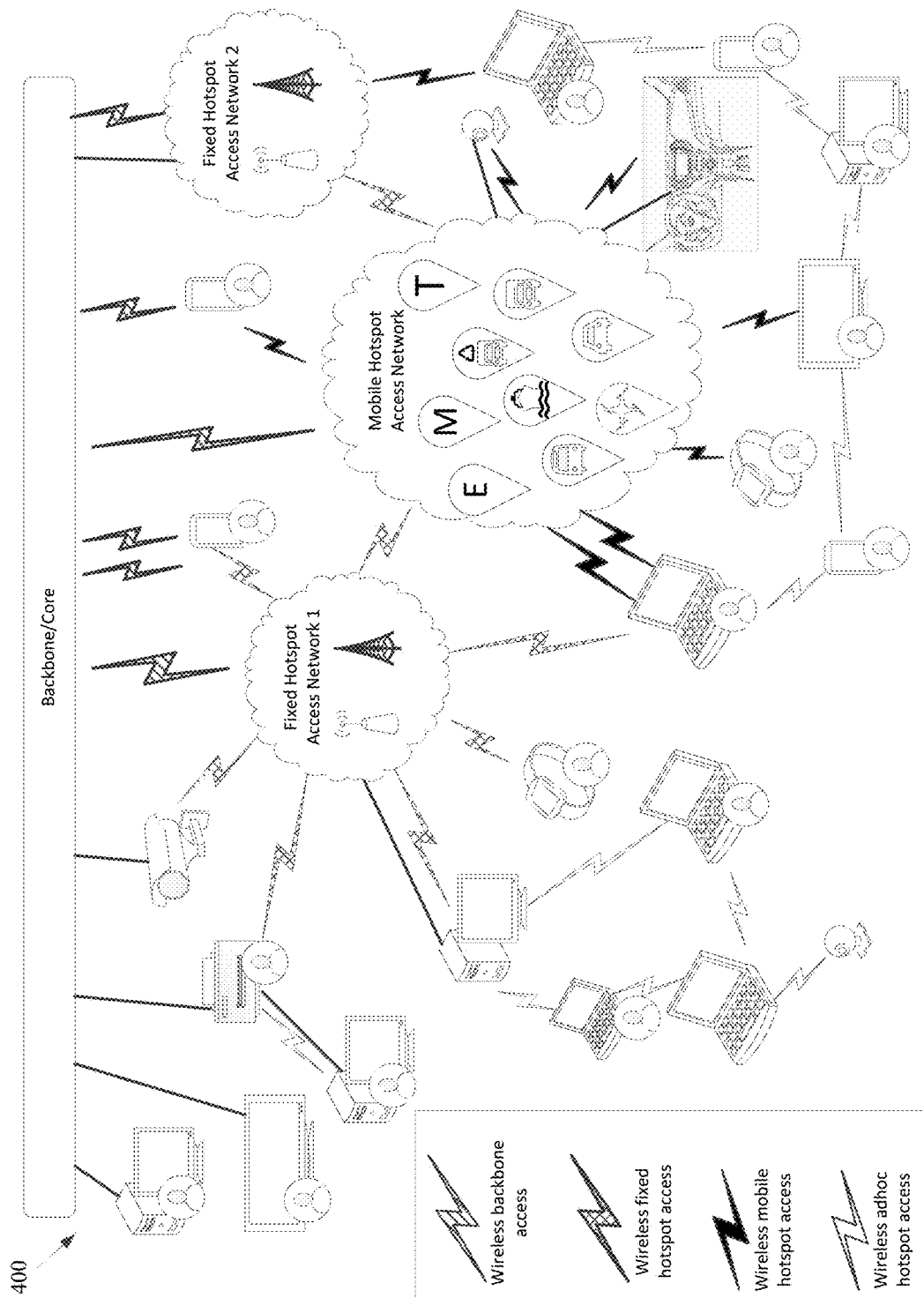
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, nodes, networks, and/or network components 100, 200, 300, 500-570, 600, 700, 800, 900, 1000, 1100, and 1200, shown and/or discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
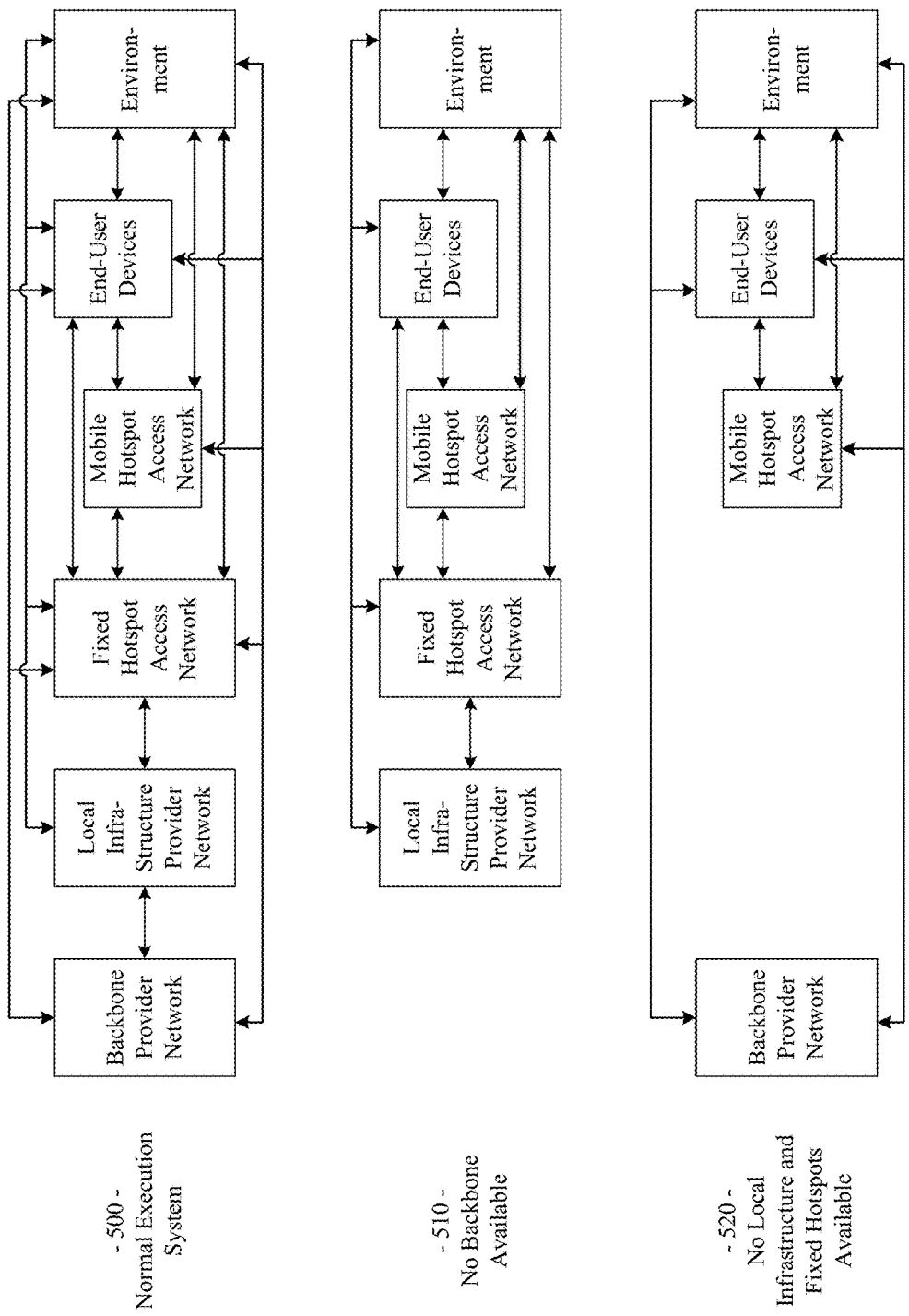
FIGS. 5A-5C show a plurality of network configurations illustrating the flexibility and/or and resiliency of a communication network, in accordance with various aspects of this disclosure.
Figure 5B:
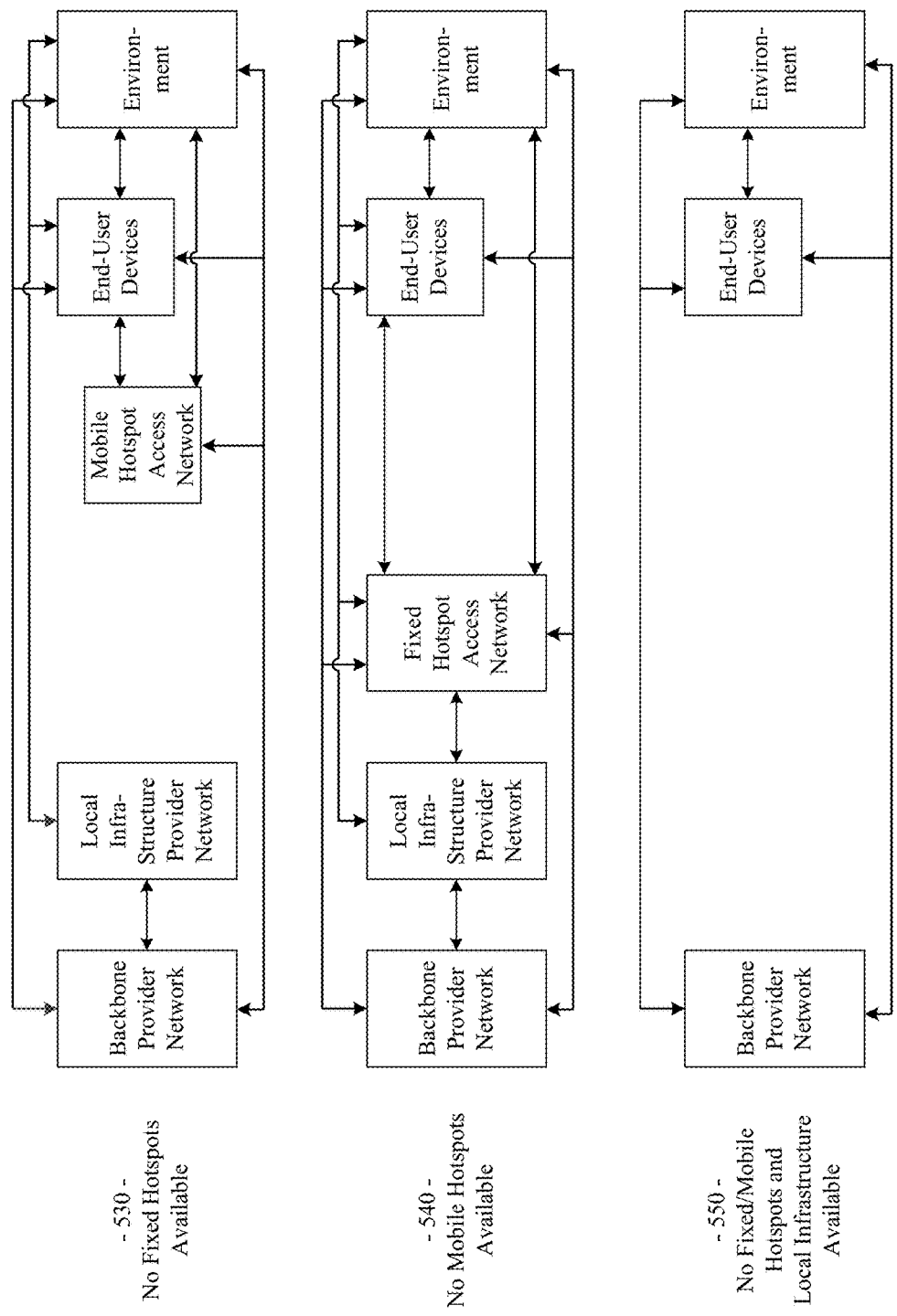
Figure 5C:
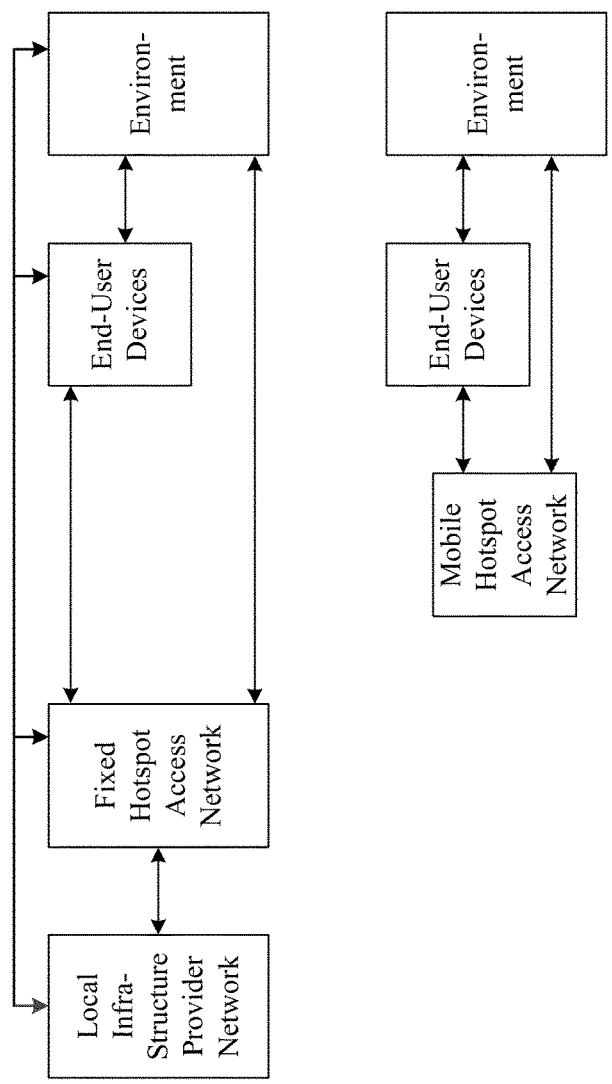

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, nodes, networks, and/or network components 100, 200, 300, 400, 600, 700, 800, 900, 1000, 1100, and 1200, shown and/or discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
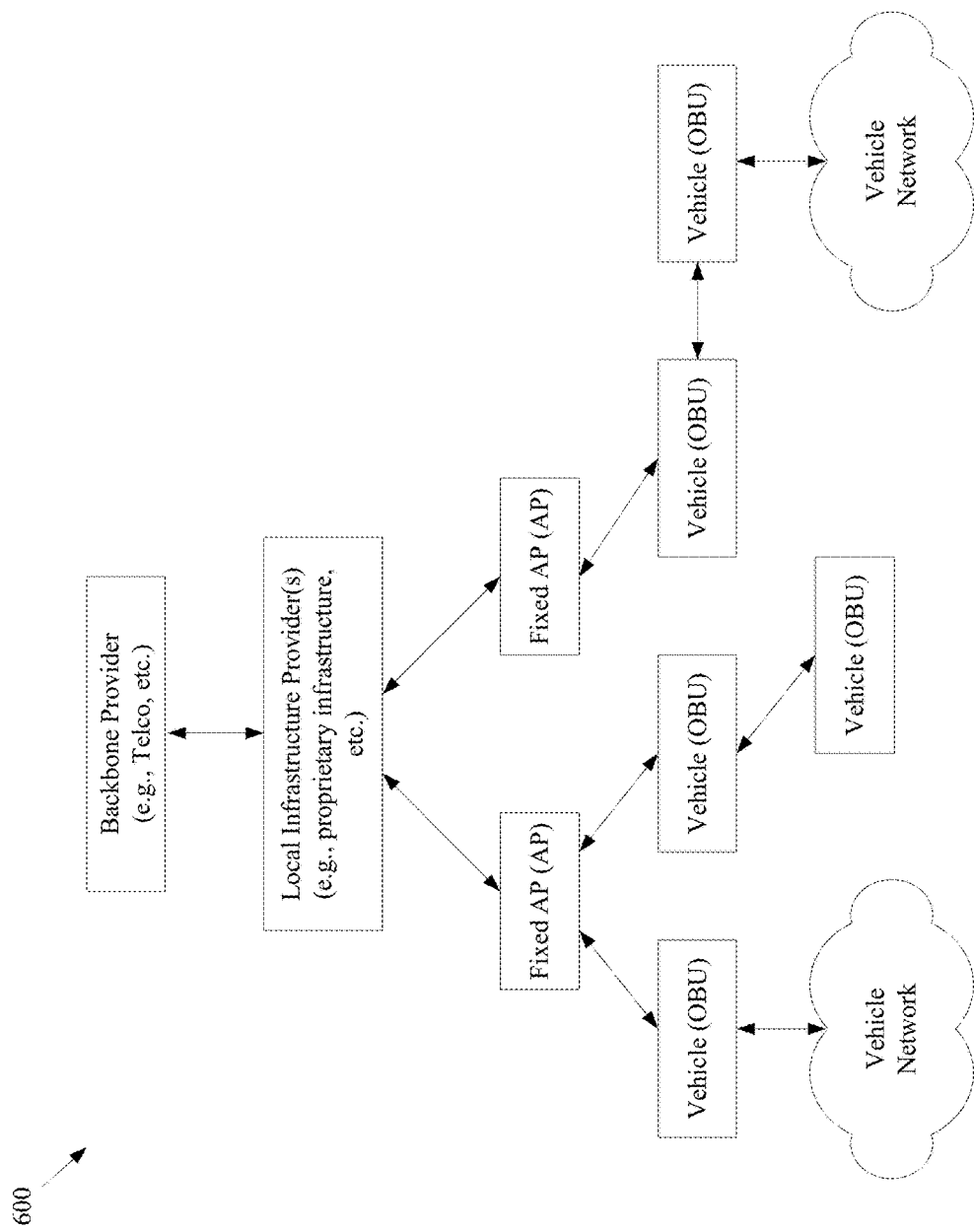
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, nodes, networks, and/or network components 100, 200, 300, 400, 500-570, 700, 800, 900, 1000, 1100, and 1200, shown and/or discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Figure 7:
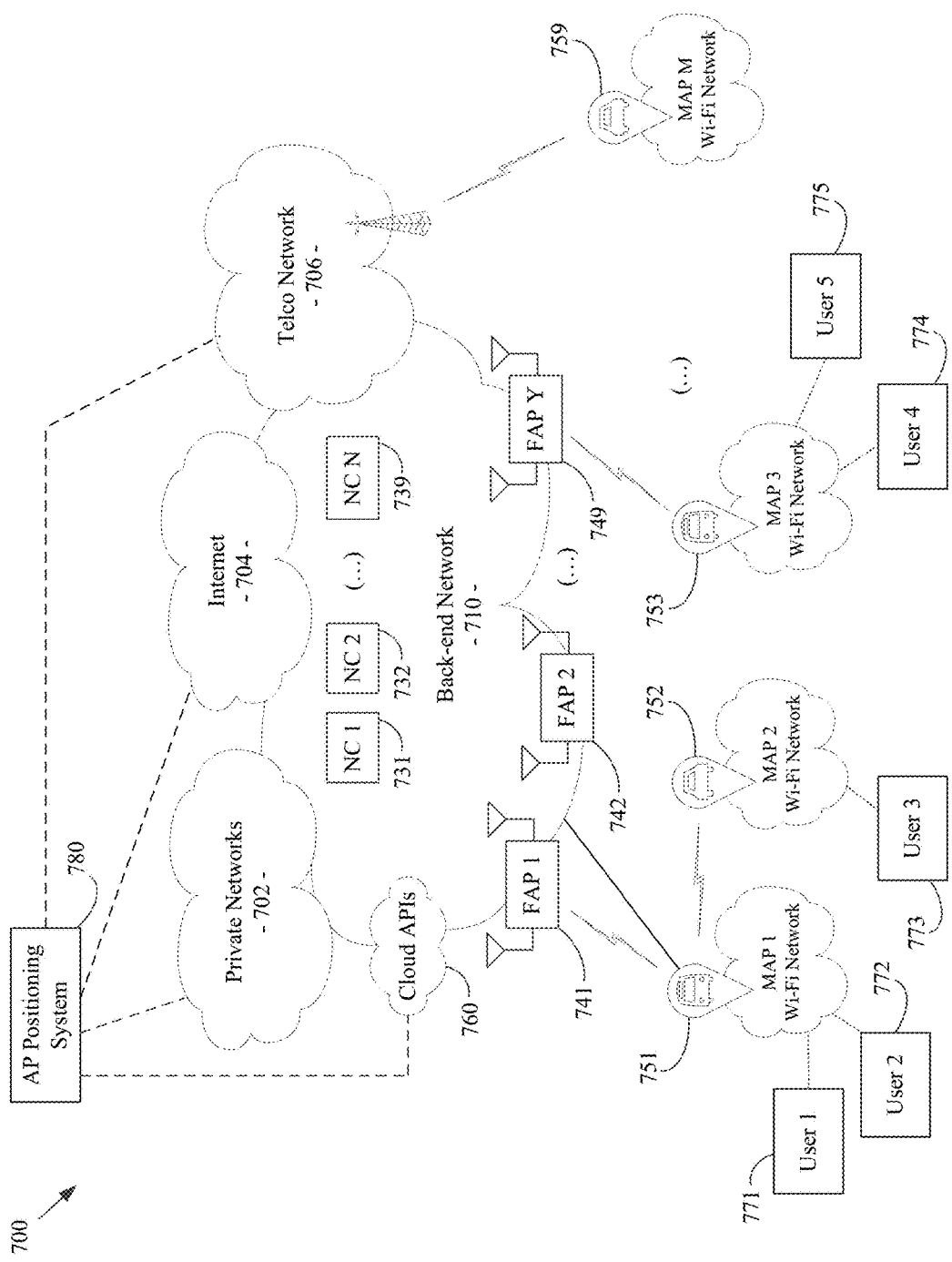
FIG. 7 shows a block diagram of an example communication network, in accordance with various aspects of the present disclosure.

FIG. 7 shows still another block diagram of an example communication network 700, in accordance with various aspects of the present disclosure. The example network 700 may, for example, share any or all characteristics with the other example methods, nodes, networks, and/or network components 100, 200, 300, 400, 500-570, 600, 800, 900, 1000, 1100, and 1200, shown and/or discussed herein. Notably, the example network 700 shows a plurality of vehicles (or Mobile APs, or OBUs), each communicatively coupled to a Fixed AP (or RSU), where each Mobile AP may provide network access to a vehicle network (e.g., comprising other vehicles or vehicle networks, user devices, sensor devices, etc.), for example a Wi-Fi network to which end user devices may connect, with which communication with sensors may be performed, with which communication with control circuitry may be performed, etc. The Mobile APs (or vehicles in which the Mobile APs are installed) may also, for example, have access to information from any of a wide array of sensors (e.g., cameras, microphones, gas or particle sensors, weather sensors, impulse sensors or accelerometers, velocity sensors, slip detectors, temperature sensors, position or location sensors, moisture detectors, pressure sensors, weight sensors, door or lid sensors, etc.). The Mobile APs may also, for example, have access to any of a variety of sensors and/or processors that measure network conditions or performance (e.g., Signal-to-noise ratio, error rate or retransmission rate, signal strength, channel loading or utilization, quality of service, etc.). The Mobile APs may, for example, gather (or collect) information from such sensors, make various autonomous decisions based at least in part on the gathered information, communicate such information to controllers (e.g., local and/or central access point positioning systems, controllers of vehicles, central network controllers and/or databases, etc.), etc. Many non-limiting examples of such operation are provided herein.

As shown in FIG. 7, an Access Point (AP) Positioning System 780 may be communicatively coupled to the network (e.g., to the Cloud, to the infrastructure, to any of a variety of public and/or private networks, etc.) in any of a variety of manners. The Access Point (AP) Positioning System 780 or any portion thereof may, for example, be implemented in a Network Operations Center (NOC), a general Cloud server, a Mobile AP, a Fixed AP, Network Controller, any node discussed herein, etc. For example, the AP Positioning System 780 may be connected to a Cloud of a network operator, for example a Back-end Network 710 (e.g., through APIs 760, via a Private Network 702, via the Internet 704, via a Telco Network 706, any combination thereof, etc.). For example, the Access Point (AP) Positioning System 780 may be communicatively coupled to any of the nodes via a backhaul network.

Also as shown in FIG. 7, a vehicle network may be connected (e.g., communicatively coupled, directly or indirectly) to one or more local User devices 771, 772, 773, 774, and 775, any of the variety of sensors discussed herein, etc. The vehicle network may, for example, comprise any or all of the nodes discussed herein. For example, the vehicle network may comprise one or more Network Controllers (NCs) (e.g., NC 1 731, NC 2 732, . . . , NC N 739, etc.), one or more Fixed APs (e.g., FAP 1 741, FAP 2 742, . . . , FAP Y 749, etc.), one or more Mobile APs (e.g., MAP 1 751, MAP 2 752, MAP 3 753, . . . , MAP M 759, etc.), etc. Such nodes may, for example, be communicatively coupled in any of the manners discussed herein. Note that, as discussed herein, a Mobile AP (e.g., as shown at example MAP 1 751 of FIG. 7) may at times connect to the network (e.g., to any node thereof, etc.) via a hard link (e.g., via wire, via an optical fiber (or tether), etc.). Such a link may, for example, be utilized when a Mobile AP (or a vehicle thereof) is parked, and the Mobile AP is operating as a Fixed AP. Also for example, such a link may be utilized in conjunction with a wireless link between the Mobile AP and a Fixed AP (or other Mobile AP). Note that in various other example implementations, the Mobile AP might only communicate wirelessly with the network.

As shown in FIG. 7, the network of moving things may comprise a plurality of vehicles, each with a respective local vehicle network that may be coupled to other vehicle networks, user devices (e.g., smart phones, personal computing devices, smart watches, scanners, etc.), smart containers or cargo systems comprising any of a variety of sensors (e.g., container sensors, environmental sensors, position sensors, inertial sensors, cameras, microphones, temperature sensors, humidity sensors, gas and/or particle sensors, weight sensors, light sensors, etc.), sensors apart from containers (e.g., container sensors, environmental sensors, position sensors, inertial sensors, cameras, microphones, temperature and/or infrared sensors, humidity sensors, gas and/or particle sensors, weight sensors, etc.), vehicle control sensors (e.g., engine sensors, temperature sensors, road condition sensors, speed sensors, location sensors, shock sensors, vibration sensors, etc.), etc.

As discussed herein, any of a variety of different types of vehicles, for example public service vehicles (e.g., infrastructure and/or road repair vehicles, infrastructure and/or road construction vehicles, waterworks vehicles, waste management vehicles, emergency services vehicles, mass transit vehicles, etc.), enterprise vehicles (e.g., emergency services vehicles, delivery vehicles, cargo shipping vehicles, taxis, limousines, shuttlebuses, telco vehicles, home services vehicles, construction vehicles, etc.), personal vehicles (e.g., vehicles for personal use only, user-owned taxi service vehicles, recreational vehicles, etc.) may spend a substantial amount of time stopped during business hours. While such vehicles are stopped (e.g., for repairing a water pipe, while waiting for a fare, while waiting for an emergency to which to respond, while maintaining a sewer system, while building or maintaining a road, while loading or unloading, while parked during the entire work day, while parked overnight, while parked between shifts, etc.), they can operate as fixed communication network nodes (e.g., as Fixed APs, as Wi-Fi hotspots, as intermediate nodes in a multi-hop vehicle communication network (e.g., based on DSRC, etc.), as cellular base stations, etc.), etc. Such vehicles may, for example, provide Internet service to people nearby.

If a sufficient number of service vehicles within a city use a technology that enables them to double as Wi-Fi Hotspots, a city may for example provide Wi-Fi access to their citizens and visitors within a wide area without having to deploy (or without having to deploy as much) expensive infrastructure. In an example implementation, service vehicles, enterprise vehicles, and/or private vehicles may be utilized to provide the desired communication network coverage.

Stopped vehicles including one or more MAPs may, for example, connect people to the Internet via cellular networks. However, solely relying on cellular would make the operation costs of this solution high and would increase the load over the cellular network. In order to decrease costs and make the solution scalable, Fixed Access Points (FAPs) equipped with DSRC (or similar technology) may be deployed at strategic locations and connected to the fiber (or hardwired) infrastructure in order to offload traffic from the cellular network. The vehicles may for example be equipped with one or more Mobile APs (or on-board units (OBUs)) providing DSRC, cellular, and Wi-Fi communication. Since DSRC may, for example, have several times the range of Wi-Fi, a singe FAP may be utilized to offload the Internet traffic of several vehicles in the neighborhood, allowing vehicles (e.g., in aggregate) to cover with Wi-Fi the equivalent to a higher range technology (e.g., DSRC, etc.). In addition, vehicles or MAPs thereof that are connected to a FAP may be utilized to reach vehicles that are not within range of any FAP via multi-hopping.

Figure 8:
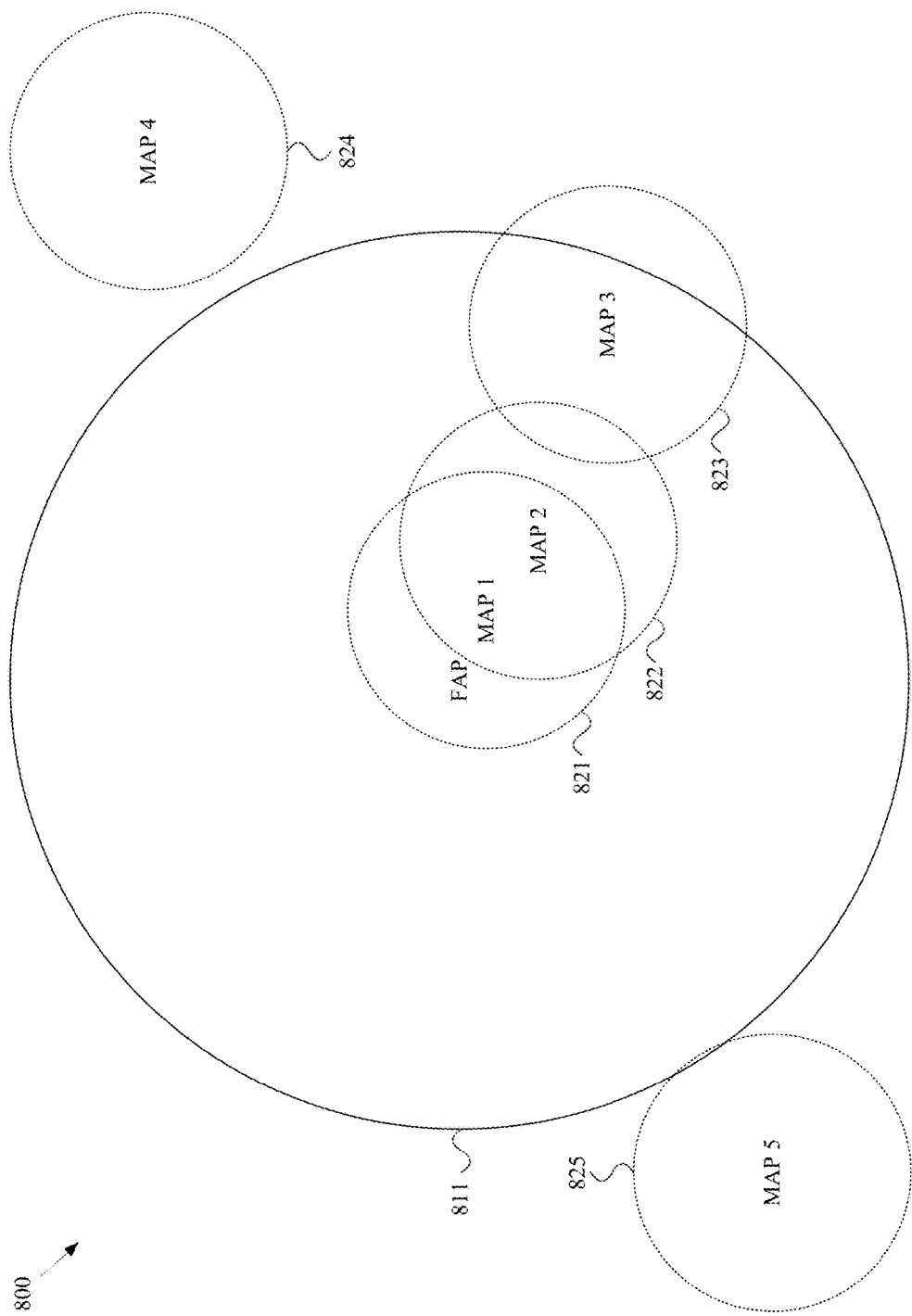
FIG. 8 shows a diagram of example communication network coverage areas, in accordance with various aspects of the present disclosure.

An example of such operation is shown at FIG. 8, which shows a diagram of example communication network coverage areas, in accordance with various aspects of the present disclosure. The example 800 may, for example, share any or all characteristics with the other example methods, nodes, networks, and/or network components 100, 200, 300, 400, 500-570, 600, 700, 900, 1000, 1100, and 1200, shown and/or discussed herein.

The large circle 811 shows the DSRC coverage of the FAP 821, while the smaller circles 821, 822, 823, 824, and 825 represent the coverage of vehicles that are stopped operating (or doubling) as Wi-Fi hotspots and/or generally providing the functionality of Fixed APs. All of the traffic of all the small circles 821, 822, and 823 corresponding to the MAPs that are inside the large circle 811 can be offloaded (e.g., offloaded from the cellular network to the vehicle network, etc.) by the FAP.

Note that even when dedicated FAPs are not available, having vehicles acting as Fixed APs (e.g., to the vehicle communication network, to the Internet, to the Cloud, etc.)

through cellular provides for a reduction in the deployment of cellular infrastructure for the telecommunication companies (telcos). For example, the FAP of FIG. 8 may be a parked MAP performing FAP functionality.

In addition to providing Wi-Fi services to people nearby, MAPs can also take advantage of the infrastructure to download/upload content without requiring cellular links (e.g., download software updates, upload video, etc.). In this case, distributing (or positioning) vehicles near FAPs is also advantageous for distributing traffic load.

Various aspects of the present disclosure provide for taking advantage of the placement or positioning of moving nodes of the network of moving things (e.g., a vehicle network, etc.) at fixed locations to, among other things, increase Wi-Fi coverage (e.g., for pedestrians, for workers, etc.), increase Wi-Fi user capacity (e.g., by increasing the number of APs in a place where there is high demand for Wi-Fi bandwidth, for example near special events or crowded places, etc.), allow moving nodes to upload/download data (for example if there are relatively large amounts of data) without requiring cellular connectivity, providing multi-hopping pathways, etc.

Various aspects of the present disclosure describe how various communication network nodes (e.g., one or more Cloud servers and/or databases, NCs, FAPs, MAPs, vehicle control systems, autonomous vehicle control systems, drivers, users, etc.) may interact to operate (or manage) a communication network to take advantage of the positional flexibility of various nodes (e.g., parked or stationary vehicles with one or more on-board MAPs, etc.).

Many example aspects of communication networks (e.g., networks comprising moving nodes, etc.) have been provided herein, for example explicitly and/or incorporated herein by reference. Such examples, among other things, comprise aspects of connection management between MAPs and the Internet. Such examples, among other things, comprise aspects for choosing when to use DSRC vs Cellular and/or for utilizing multi-hopping with MAPs for extending effective FAP range. See, for example, U.S. patent application Ser. No. 15/245,992, titled "Systems and Methods for Managing Connectivity in a Network of Moving Things," filed on Aug. 24, 2016, which claims priority to U.S. Provisional Application Ser. No. 62/222,121, titled "Systems and Methods for Managing Connectivity in a Network of Moving Things," filed on Sep. 22, 2015, each of which is hereby incorporated herein by reference in its entirety for all purposes.

Such examples, among other things, also comprise aspects of handovers, load distribution, multi-MAP scenarios, scenarios in which a plurality of MAPs are within communication range (e.g., within range of a user device, within range of another MAP, within range of a FAP etc.). See, for example: U.S. patent application Ser. No. 15/191,732, titled "Systems and Methods for Managing Mobility in a Network of Moving Things," filed on Jun. 24, 2016, which claims priority to U.S. Provisional Application Ser. No. 62/222,098, titled "Systems and Methods for Managing Mobility in a Network of Moving Things," filed on Sep. 22, 2015, each of which is hereby incorporated herein by reference in its entirety for all purposes; U.S. patent application Ser. No. 15/352,979, titled "Systems and Methods for Managing Network Controllers and Their Network Interactions in a Network of Moving Things, for Example Including a Network of Autonomous Vehicles," filed on Nov. 16, 2016, which claims priority to U.S. Provisional Patent Application Ser. No. 62/273,715, filed on Dec. 13, 2015, and titled "Systems and Methods for Managing Mobility Controllers and Their Network Interactions in a Network of Moving Things," each of which is hereby incorporated herein by reference in its entirety for all purposes; U.S. patent application Ser. No. 15/352,953, titled "Systems and Methods for Managing and Triggering Handovers of Mobile Access Points in a Network of Moving Things, for Example Including a Network of Autonomous Vehicles," filed on Nov. 16, 2016, which claims priority to U.S. Provisional Patent Application Ser. No. 62/281,432, filed on Jan. 21, 2016, and titled "Systems and Methods for Managing and Triggering Handovers of Mobile Access Points in a Network of Moving Things," each of which is hereby incorporated herein by reference in its entirety for all purposes; U.S. Provisional Patent Application Ser. No. 62/326,267, filed on Apr. 22, 2016, and titled "Systems and Methods for Managing Mobility of Users in a Network of Moving Things at the Backhaul," which is hereby incorporated herein by reference in its entirety for all purposes; U.S. Provisional Patent Application Ser. No. 62/326,277, filed on Apr. 22, 2016, and titled "Systems and Methods for Managing Mobility of Users in a Network of Moving Things at the Edge," which is hereby incorporated herein by reference in its entirety for all purposes; and U.S. Provisional Patent Application Ser. No. 62/355,149, filed on Jun. 27, 2016, and titled "Systems and Methods for Managing and Triggering Handover of Users in a Network of Moving Things," which is hereby incorporated herein by reference in its entirety for all purposes.

Various aspects of the present disclosure provide systems and methods that, among other things, determine and recommend (or suggest or mandate, etc.) one or more parking locations for vehicles based on communication network needs (e.g., needs for user Wi-Fi coverage, needs for FAP service, needs for FAP load balancing or shifting, needs for cellular offloading, needs for multi-hop pathways, etc.). For example, vehicles carrying MAPs may be parked at locations to optimize the networking goals (e.g., Wi-Fi coverage or providing goals, FAP coverage goals, FAP load balancing goals, cellular offloading goals, etc.).

Various aspects of the present disclosure provide systems and methods that incentivize vehicle parking, for example to encourage vehicle participation in providing networking services at particular fixed locations. For example, free or low-cost parking spots may be offered at optimal locations for vehicles that can provide Wi-Fi and/or Fixed AP service at such locations. Note that such parking spots may be fixed and/or may be dynamically adjusted according to present needs (e.g., according to present and/or anticipated vehicle density, according to present and/or anticipated Wi-Fi and/or FAP service need, etc.).

As discussed herein, such vehicles may comprise any of a variety of characteristics. For example, such vehicles may be autonomous, remote operator controlled, local operator controlled, etc. Such vehicles may, for example, be land vehicles. Alternatively, such vehicles may also be watercraft, aircraft, etc.

The locations may, for example, be negotiable, for example depending on networking needs, depending on location or positioning needs of the vehicles or operators thereof, etc. Such locations may, for example, be pick-up and/or drop-off locations. Such locations may, for example, be utilized as staging areas for pick-up and/or drop-off at other locations (e.g., awaiting dispatch to another location, etc.).

The determination of where to park the vehicle may be performed locally at the vehicle, centrally, and/or in a distributed fashion including both local and central participation. For example, in an example scenario in which the determination of where to park the vehicle is performed locally, a vehicle (or MAP thereof) may determine to park at locations where the vehicle (or MAP thereof) determines that there is no (or poor) Wi-Fi coverage. In an example scenario in which the determination of where to park the vehicle is performed centrally, a central entity (e.g., an AP Positioning System, some central server, etc.) may have global knowledge about vehicle location and capability (e.g., communication capability, movement capability, energy resources, etc.), FAP location, node load, strong and/or weak Wi-Fi coverage areas, current and future networking needs, knowledge of historical communication needs and/or network utilization, etc.

In an example scenario comprising a local decision (e.g., at the vehicle, MAP, etc.), vehicles (e.g., on-board AP Positioning Systems thereof, etc.) may track (e.g., map, etc.) Wi-Fi coverage while moving and then travel to the place with the lowest quality coverage. For example, vehicles may store and score several candidate locations and, when free to park, may park in the location that offers the best compromise between distance to the next pickup point and score. The compromise may, for example, comprise minimizing a cost function that includes estimated time to travel from a location to a next likely location and incentives offered for parking at the location. Such a cost function may, for example, comprise information of a geographical range or boundary within which the vehicle must stay.

In an example scenario comprising centralized decisions about where to park, a system (e.g., an AP Positioning System, some central server, etc.) that is aware of the locations of all vehicles and/or FAPs may make the parking decisions. In an example case, the system may try to maximize coverage by suggesting (or recommending or mandating) parking spots where the density of vehicles (with AP capability) is lower and may attempt to balance demand with other system needs or goals. Additionally, the system may suggest a place that would enable several vehicles to connect to a FAP using multi-hop, making the bridge between these vehicles and the FAP. Historical information collected by the system about demand of Wi-Fi by time and place may, for example, be utilized to decide which places have higher priority. For example, machine learning algorithms can also be used here to predict which areas will need coverage in the short-term, in order to guarantee that high-demand areas always have vehicles providing the needed service.

Various aspects of this disclosure also comprise a vehicle (or MAP thereof) providing feedback (e.g., about present communication conditions at a particular location, about the communication services provided at a particular location, about parking locations, etc.) to a central system. Such feedback may, for example, comprise information identifying locations at which there was low Wi-Fi demand, locations at which a DSRC connection to a FAP was poor (e.g., due to obstacles, etc.), locations at which hard communication ports failed, etc.

Figure 9:
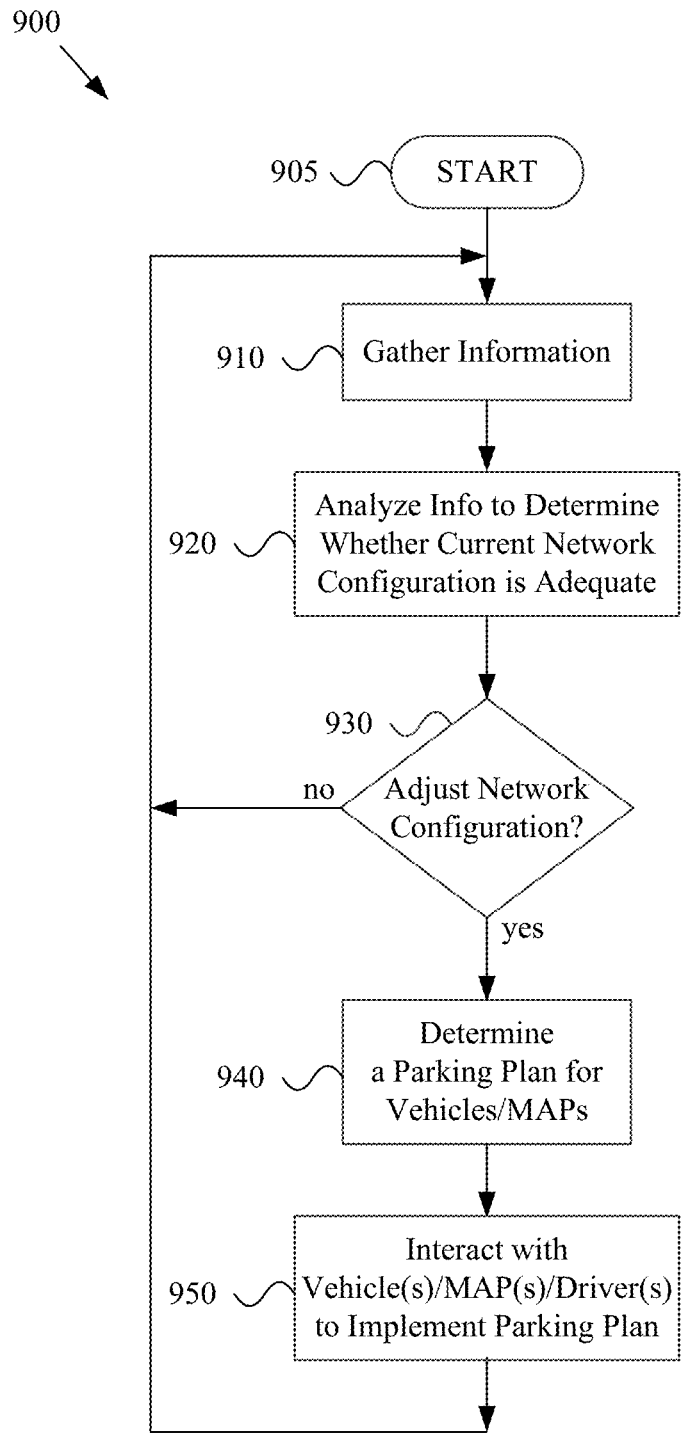
FIG. 9 shows a flow diagram of an example method of controlling mobile access point positioning, in accordance with various aspects of the present disclosure.

FIG. 9 shows a flow diagram of an example method of controlling mobile access point positioning, in accordance with various aspects of the present disclosure. The example method 900 may, for example, share any or all characteristics with the other example methods, nodes, networks, and/or network components 100, 200, 300, 400, 500-570, 600, 700, 800, 1000, 1100, and 1200, shown and/or discussed herein. By way of example, the example method 900 (or any portion thereof) may be implemented by a central server (e.g., Cloud-based, private network based, etc.), for example a central AP Positioning System, may be implemented by a Mobile AP or any other network node discussed herein, and/or may be implemented in a distributed manner, for example with any block (or portion thereof) or set of blocks being implemented by a different respective node.

The example method 900 begins executing at block 905. The example method 900 may begin executing in response to any of a variety of causes or conditions, non-limiting examples of which are provided herein. For example, the example method 900 (e.g., any block thereof) may receive execution flow from any other method or method step discussed herein. Also for example, the example method 900 (e.g., any block thereof) may receive execution flow from any block (or portion thereof) of the example method 900. Additionally, for example, the example method 900 may begin executing in response to execution of an application by a system implementing any or all aspects of the example method 900, by a power-up and/or reset condition of such a system, etc. Further for example the example method 900 may begin executing in response to a user command. Still further for example, the example method 900 may continually execute so long as a system (or systems) implementing the method 900 is running. In general, the example method 900 (or any portion thereof) may begin executing in response to any of a variety of causes or conditions. Accordingly, the scope of this disclosure should not be limited by characteristics of any particular initiating cause or condition.

The example method 900 may, at block 910, comprise gathering information regarding the communication network. As discussed herein, the gathered information may, for example, be analyzed at block 920, at block 940, etc.

Block 910 may comprise gathering the information in any of a variety of manners, non-limiting examples of which are provided herein. For example, block 910 may comprise retrieving the information from one or more networked databases. Also for example, block 910 may comprise receiving the information from any or all nodes of the communication network. For example, such receiving may be active (e.g., including soliciting the information from network nodes) and/or passive (e.g., receiving unsolicited information from network nodes). Block 910 may comprise gathering the information via any or all of the communication pathways discussed herein.

The gathered information may comprise any of a variety of characteristics, non-limiting examples of which are discussed herein. For example, the gathered information may comprise information regarding historical network behavior and/or utilization. Such information may, for example, comprise time/day/location map information, information of typical (or historical) rush hour communication needs, information of typical (or historical) event communication needs, information of typical holiday communication needs, etc. For example, such information may comprise information indicating the historical need for (or usage of) Wi-Fi services (and/or multi-hop access point services, etc.) at locations and associated with days, times, events, weather, etc. Such information may, for example, comprise information of historical Wi-Fi usage patterns associated with a warm sunny day and/or a cold rainy day (e.g., usage patterns at beaches, parks, ballfields, boardwalks, outdoor shopping malls, indoor shopping malls, popular outdoor locations, skating/sledding area, indoor entertainment venues, etc.).

Additionally, such information may comprise information of present and/or historical road occupancy of vehicles that have AP functioning capability and/or do not have AP functioning capability. Such information may, for example, comprise information of location and AP capability from all vehicles presently in service, from all vehicles registered as presently willing to provide parked-vehicle AP functionality, from all vehicles that are contractually obligated to provide parked-vehicle AP functionality, etc. Such information may also, for example, comprise information of current traffic density, including vehicles with AP functionality (e.g., potential service providers, etc.) and/or vehicles without AP functionality (e.g., potential service utilizers, etc.). This information may, for example, be received from the vehicles (or MAPs thereof), from vehicle fleet controllers, from a central database storing information of a plurality of vehicle fleets, etc.

The gathered information may also, for example, comprise information of historical and/or real-time network conditions (e.g., network and/or node loading, Wi-Fi utilization, QoS/QoE, noise levels, signal-to-noise ratio, signal strength, number of detected Wi-Fi devices, number of detected FAPs and/or MAPs, etc.). As discussed herein, vehicles (or MAPs thereof) may provide feedback information concerning an area in general, concerning an area associated with a present parking location, etc.

The gathered information may additionally, for example, comprise event information. For example, the information may comprise a respective schedule of events and/or anticipated crowd level at a plurality of entertainment venues or areas (e.g., concert halls or amphitheaters, stadiums, malls, parks, ballfields, beaches, parade routes, schools, ball courts, coliseums, transportation hubs, parking lots, etc.).

The gathered information may further, for example, comprise weather information (e.g., present and/or anticipated weather conditions, for example, temperature, cloudiness, precipitation, humidity, etc.). The gathered information may also, for example, comprise emergency information (e.g., real-time emergency information, for example accidents, fires, public safety threats, toxic spills, etc.). The gathered information may additionally, for example, comprise real-time and/or anticipated traffic information, road condition information, etc.

The gathered information may also comprise any of a variety of types of vehicle information. For example, the gathered information may comprise information identifying the type of vehicle, whether and/or for how long the vehicle is presently available, the fleet of which the vehicle is a member, the owner of the vehicle, etc.

As discussed herein, vehicles (or MAPs thereof) may provide information indicating the presence and/or performance of a parked vehicle providing AP services (e.g., vehicle heartbeat messages, etc.).

In general, block 910 may comprise gathering information, for example information that may be utilized for further analysis (e.g., at block 920, at block 940, etc.). Accordingly, the scope of this disclosure should not be limited by characteristics of any particular type of gathered information and/or by characteristics of any particular manner of gathering such information.

The example method 900 may, at block 920, comprise analyzing information (e.g., the information gathered at block 910, etc.) to determine whether a network configuration adjustment is needed. Block 920 may comprise performing such analyzing in any of a variety of manners, non-limiting examples of which are discussed herein.

For example, block 920 may comprise analyzing the information to determine whether the current (and future) network configuration, for example if operating correctly, will provide the desired communication services. Such analysis may, for example, comprise if the current network configuration is meeting current communication needs, if the current network configuration is anticipated to meet future communication needs, etc. Such analysis may, for example, comprise determining if additional (or fewer) fixed access points are needed.

Note that block 920 may also comprise analyzing the health of network nodes (e.g., identifying failed nodes, identifying failing nodes, etc.) to, for example, provide failover recovery.

In an example scenario, block 920 may comprise determining if there are any dead zones that need to be covered (and/or live zones that do not need to be covered). Block 920 may comprise determining if there are any network nodes (e.g., FAPs, MAPs, etc.) that are operating at a loading level that is too high (or too low, corresponding to an underutilized asset).

Such analysis may comprise analyzing current real-time network capability and communication service needs, and also determining anticipated network capability and communication service needs (e.g., based at least in part on present or upcoming events, present or forecast weather, present or historical needs, etc.).

As discussed herein, some of the information gathered at block 910 may comprise vehicle status information. The analysis of block 920 may, for example, be based on such information. For example, when a vehicle registers that a passenger has been dropped off, or a package delivered, or some other travel event completed (and no other event is imminent), a message may be generated and delivered to the system indicating that the vehicle is presently available for parking or looking to park.

In an example scenario, a vehicle may have requested a release from a parking obligation, and the method may grant such release request if the communication need for which the vehicle was parked no longer exists, if another vehicle has arrived at the scene to take over the communication responsibilities of the vehicle requesting release, etc. In another example scenario, the system may respond to a request for a release by soliciting other vehicles to take over the parking/network-providing task.

In general, block 920 may comprise determining whether the current (or anticipated) network configuration is adequate for performing the current (or anticipated) communication needs. Accordingly, the scope of this disclosure should not be limited by characteristics of any particular determination or manner of performing such a determination.

The flow control block 930 directs execution flow of the example method 900. For example, if it is determined at block 920 that the network configuration does not need to be adjusted (e.g., by parking vehicles/MAPs, moving parked vehicles/MAPs or communication assets, etc.), then block 930 directs execution flow of the example method 900 back up to block 910 for continued gathering and/or analysis of information. If, however, it is determined at block 920 that the network configuration needs to be adjusted (e.g., by parking vehicles/MAPs, by moving parked vehicles/MAPs or communication assets, etc.), then block 930 directs execution flow of the example method 900 to block 940.

The example method 900 may, at block 940, comprise determining a parking plan for vehicles (and their respective Mobile APs). Block 940 may comprise determining the parking plan in any of a variety of manners, non-limiting examples of which are provided herein.

Block 940 may, for example, comprise analyzing communication needs and/or available vehicles/MAPs to optimize the network configuration including parked vehicles providing AP services (e.g., wireless LAN services, multi-hop infrastructure services, etc.).

For example, block 940 (or other blocks, for example block 910) may comprise maintaining a list (or pool or map) of vehicles that are able (or able and willing, or contractually obligated, etc.) to park and provide communication services. Note that such vehicles may already be parked. Block 940 may thus analyze the list (or pool or map) of available vehicles to identify the best candidate vehicles for providing the desired services (e.g., to provide or augment communication network services in an area, to assist a failing node in a particular area, etc.).

Maintaining the list (or pool or map) of available vehicles may comprise many characteristics. For example, a vehicle (or system thereof, or driver thereof, etc.) or vehicle fleet may communicate a message requesting to participate. Also for example a vehicle or vehicle fleet may sign up for unsolicited (or pushed) parking requests. For example, a fleet of public service vehicles (e.g., buses, construction vehicles, road repair vehicles, waste management vehicles, waterworks vehicles, public safety vehicles, etc.), a fleet of enterprise vehicles (e.g., taxi/limo companies, shuttle bus companies, ambulance companies, road construction companies, road service companies, etc.), an individual, etc., may contract out parked AP services to a communication company, for example agreeing to provide parked AP service upon request.

Block 940 may comprise identifying the participating vehicles, identifying parking locations for such vehicles, identifying parking time windows for such vehicles, identifying the types of communication service to provide at the parked location (e.g., Wi-Fi services, multi-hop infrastructure services for other APs, wireless backhaul services, wired and/or tethered optical backhaul services, etc.).

For example, as discussed herein, there may be regions having a relatively low density of vehicles (e.g., vehicles providing MAP service). In such a scenario, block 940 may comprise identifying one or more locations in such regions at which vehicles may be parked (and thus effectively provide FAP service) and assigning respective vehicles to park at such locations.

In another example scenario, block 940 may comprise determining based at least in part of knowledge of an upcoming entertainment event that additional communication bandwidth will be needed near the venue. Block 940 may then identify parking locations (e.g., based at least in part on a parking map) at which vehicles capable of providing AP services are to park. Such parking locations may, for example, comprise parking spots at or near the venue, parking locations at or near ingress/egress vehicle bottleneck locations, parking locations near mass transit stations, etc.

Note that, as discussed herein, vehicles (or MAPs thereof) may provide feedback regarding the networking environment (e.g., communication infrastructure connectivity, user needs, etc.). In a scenario in which a vehicle provides feedback indicating that the vehicle parked at a current location has a poor wireless connection to a FAP (or a poorly working or broken wired/tethered network connection), such feedback may cause block 940 to adjust the parking plan. For example, block 940 may comprise identifying an alternative parking spot for the vehicle, identifying an additional parking location for an additional vehicle that will provide multi-hop functionality to remedy the lack of FAP connectivity for the vehicle (e.g., positioned between the vehicle and the FAP), etc. In another scenario, the vehicle (or MAP thereof) may provide feedback indicating that the need for Wi-Fi connectivity has substantially waned or disappeared (e.g., due to an event ending and a crowd clearing, etc.). In such a scenario, block 940 may comprise determining to release the vehicle from the parking location, to release a portion of a set of vehicles from respective parking locations, etc.

Note that in various scenarios, as explained above, the feedback information may be used in other blocks to refine the communication coverage model. For example in a scenario in which a vehicle provides feedback information indicating poor FAP coverage at a location, the model may be adjusted to try to avoid using that location again and/or for proactively planning the multi-vehicle multi-hop parking configuration rather than reactively bringing in another vehicle for performing the multi-hop functionality.

Various aspects of the present disclosure provide for the utilization of vehicles that have AP capability (e.g., that carry one or more MAPs, etc.), but which are primarily purposed or primarily utilized for purposes other than providing communication services (e.g., stationary communication services, communication infrastructure services, multi-hop AP communication services, etc.), for example to the general public. For example, such vehicles may comprise vehicles primarily purposed or primarily utilized for moving people (e.g., enterprise vehicles or personal vehicles providing a taxi service, buses, limousines, boats, autonomous or manually operated vehicles, watercraft, etc.), vehicles primarily purposed or primarily utilized for moving cargo (e.g., mail delivery trucks, good delivery trucks, cargo trucks, barges, drones, etc.), vehicles primarily purposed or primarily utilized for performing public infrastructure services (e.g., waste management or collection, waterworks maintenance, sewer maintenance, road repair or construction, etc.), vehicles primarily purposed or primarily utilized for performing public safety services (e.g., firefighting vehicles, police vehicles, ambulance services, paramedic services, etc.), etc. Such vehicles may, for example, comprise land vehicles, watercraft, aircraft, etc. Such vehicles may, for example, comprise autonomous vehicles, remotely automatically operated vehicles, remotely manually operated vehicles, locally manually operated vehicles, etc. Such vehicles may, for example, provide communication links in support of their primary purpose, but the providing of the communication links is not their primary focus. For example, a public transportation bus is primarily purposed for moving people, but may provide communication services to its passengers as a secondary function. Note that, the various aspects of the present disclosure may also be applied to vehicles, the primary or sole purpose of which, is to provide or support (e.g., monitoring, testing, maintaining, etc.) communication services (e.g., vehicles that have no other substantial purpose than to provide or support communication services).

Thus, in accordance with various aspects of the present disclosure, an AP (or vehicle) Positioning System may leverage the flexibility of a plurality of independently operated vehicles or vehicle fleets to provide communication functionality. For example, a bus fleet, a taxi fleet, an emergency services fleet, a package delivery fleet, etc., may be utilized.

In accordance with various aspects of the present disclosure block 940 may comprise offering incentives for a vehicle to park and perform AP services at a location. For example, as discussed herein, in various example scenarios, the parking plan determined at block 940 may include vehicles that are not mandated to operate in accordance with the parking plan. In such example scenarios, block 940 may comprise determining incentives to be offered to the vehicle (or operator thereof, or central manager thereof, or owner thereof, etc.).

The incentives may comprise any of a variety of characteristics. For example, the incentives may comprise monetary incentives, free or reduced-price communication services, free or reduced-price parking, free or reduced-price energy (e.g., gasoline, electricity, etc.), shopping or vacation discounts, club memberships, shopping point accumulation, etc. Note that the incentives may have already been negotiated and specified as part of a contractual obligation between an organization that manages a fleet of vehicles (or an operator of a single vehicle) and the organization that provides communication network services.

In an example implementation in which block 940 comprises identifying incentives for a requested parking action, block 940 may comprise determining whether the desired communication service to be provided by the parked vehicle (or MAP thereof) is worth the incentive. For example, at some incentive level, providing the desired communication service may be cost prohibitive. In an example implementation, the communication service needs at particular locations may be prioritized, and incentives may be scaled to the priorities.

Incentives may be a function of absolute time, day, type-of-day, amount of time, etc., at which or during which the vehicle is parked and providing communication services. For example, the incentive may be calculated as a function of the amount of time during which the vehicle is providing communication services. Operation during holidays, for example, may result in higher incentives. Operating at a time/day at which historically a relatively low percentage of vehicles are willing to park and perform the communication services may, for example, correspond to a relatively higher incentive. Operating during days and/or times at which many vehicles are available to participate may, for example, correspond to a relatively lower incentive.

In an example implementation, block 940 may comprise offering free parking at an entertainment event for vehicles that park and provide communication services (e.g., AP services, etc.) during the event, for a time period before the event, for a time period after the event, etc. For example, block 940 may map out (and reserve) a matrix (or other pattern) of parking spots in ballpark parking areas, and determine to offer free parking for vehicles that agree to park in such spots and provide communication services (e.g., AP services, etc.). The offer may, for example, also include free or reduced-price tickets to the event, coupons for free or discounted goods sold at the event, etc. Also for example, block 940 may comprise offering weekly or monthly parking at a reserved parking location for vehicles that agree to park at such locations and provide communication services.

Note that parking locations may, for example, comprise an energy source from which a MAP of the vehicle (or a vehicle charger) may receive electrical power. Also note that in an example implementation into which the vehicle is instructed to hard-wire or optically tether to the communication infrastructure, a parking location may have communication ports for providing the necessary network connectivity.

In another example implementation, block 940 may comprise offering a free electrical vehicle charge for a vehicle that agrees to park at the charging station during a particular time window and provide communication services (e.g., AP services, etc.). Also for example, block 940 may comprise offering a free gallon of gas for every respective time period during which a vehicle parks and provides communication services. Block 940 may, for example, maintain respective accounts for vehicles, vehicle fleets, operators, etc., which may then be accessed by the recipient when needed.

In an example implementation, an incentive may be associated with respective requirements (e.g., minimum time requirements, etc.). In an example scenario, block 940 may comprise determining a free parking incentive during the work week if the vehicle is parked at the location during one or both of the morning and evening rush hours.

In general, block 940 may comprise determining a parking plan for vehicles (and their respective Mobile APs). Accordingly, the scope of this disclosure should not be limited by characteristics of any particular type of parking or by characteristics of any particular manner of determining a parking plan.

The example method 900 may, at block 950, comprise interacting with (e.g., communication with, negotiating with, etc.) vehicles (or MAPs or drivers or fleet controllers, etc.) to implement the parking plan determined at block 940. Block 950 may comprise performing such interacting in any of a variety of manners, non-limiting examples of which are provided herein.

Note that the interacting of block 950 may cause block 940 to modify a determined plan, for example in an iterative manner.

Block 950 may, for example comprise communicating a signal directing (e.g., mandating, requesting, etc.) a vehicle to park at a particular location and provide communication services (e.g., AP services, FAP services, WLAN services, etc.). The signal may, for example, comprise coordinate information, navigation information, map information, etc.

As discussed herein, in an example scenario, the vehicle (or driver or fleet controller, etc.) may accept the parking recommendation and incentive if offered. Also for example, the vehicle may decline the offer, present a counteroffer, etc. The vehicle (or driver or controller, etc.) may thus negotiate with the system to obtain acceptable or best terms. In an example scenario in which the vehicle is a personal vehicle being utilized to provide a taxi service, the vehicle driver may consider whether an offered incentive to park at a location during a particular time window is worth the lost income for the fares that might be missed during the particular time window. The driver may, for example, accept the offer, decline the offer, present a counteroffer, etc. Note that during negotiations, a parking location may be reserved and then released if agreement is not reached (or is not reached within a particular amount of time).

As discussed herein, the system may monitor whether the vehicle is at the location and/or whether the vehicle is performing the desired communication services. Various aspects of the present disclosure also provide for tracking the vehicle as it proceeds to the parking location, for example to ensure that the plan is being implemented according to plan. For example, if a vehicle is caught in traffic and unable to meet its time requirements, block 940 may modify the parking plan, causing block 950 to engage other vehicles that might be able to reach the desired location in time to provide the desired communication service. Such location information may, for example, be provided by the vehicle, by a central controller that is monitoring the vehicle location, etc.

Also as discussed herein, the vehicle (or MAP or driver) may provide feedback to the system concerning conditions at the parking location. Though block 940 may comprise monitoring the availability of parking locations, a scenario may be experienced in which a recommended parking spot is unavailable (e.g., due to another vehicle parked there, due to a snow pile or other obstacle, due to a road closure, etc.). In this scenario, block 940 may comprise modifying the parking plan to utilize an alternative parking location, for example to provide the same (or nearly the same) communication services. Block 950 may then, for example, comprise directing the vehicle to the alternative parking location.

In general, block 950 may comprise interacting with (e.g., communication with, negotiating with, etc.) vehicles (or MAPs or drivers or fleet controllers, etc.) to implement the parking plan determined at block 940. Accordingly, the scope of this disclosure should not be limited by characteristics of any particular type of interacting.

Figure 10:
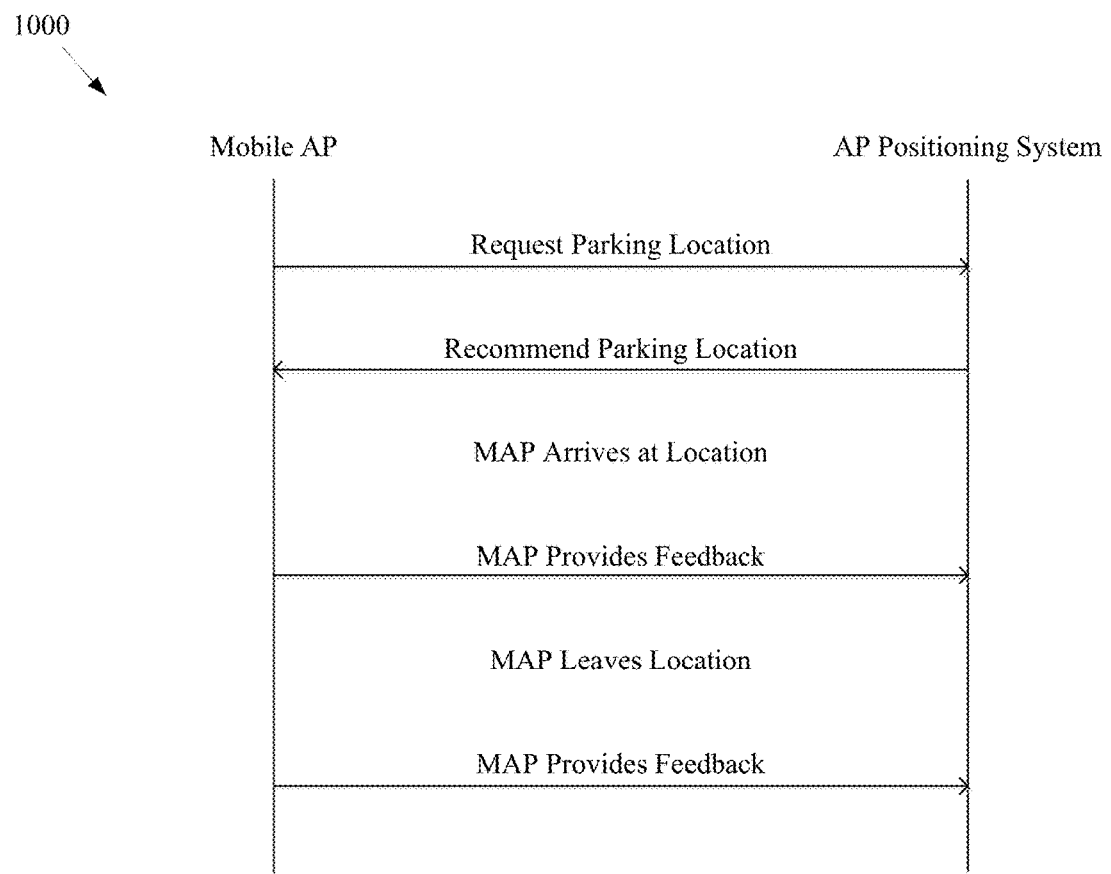
FIG. 10 shows a diagram of an example method of controlling mobile access point positioning, in accordance with various aspects of the present disclosure.

FIG. 10 shows a diagram of an example method of controlling mobile access point positioning, in accordance with various aspects of the present disclosure. The example method 1000 may, for example, share any or all characteristics with the other example methods, nodes, networks, and/or network components 100, 200, 300, 400, 500-570, 600, 700, 800, 900, 1100, and 1200, shown and/or discussed herein. The example method 1000 is presented in the context of example messages that may flow between a Mobile AP and the AP Positioning System. Note that, as discussed herein, the AP Positioning system (or any portion thereof) may reside in a Cloud server, in a Network Controller, in a module of the Mobile AP, etc.

As discussed herein, a vehicle (or MAP thereof) may explicitly request a parking location, register for push (or unsolicited) parking location recommendations (or offers), etc. In the example shown in FIG. 10, a vehicle requests a parking location from the AP Positioning System. For example, a vehicle operator may input a user input requesting a parking recommendation, a system associated with the vehicle may determine that the vehicle has just completed a task (e.g., dropping off a passenger, delivering a package, moving workers to a location, etc.) and the system may automatically (e.g., independent of an immediate user input) communicate a request to the AP Positioning System, etc.

The request may, for example, comprise any of a variety of types of information that may be processed by the AP Positioning System to determine whether and/or what parking location to identify. For example, the request may comprise information identifying the current location of the MAP (or associated vehicle), a general range of operation for the MAP (or associated vehicle), a time duration at which the MAP is allowed or willing to remain parked, traffic needs of the vehicle, whether the vehicle needs to be able to leave within a particular amount of time after being notified of an action to perform, a next anticipated or actual pick-up location and/or time, a maximum distance to a next actual or anticipated pick-up location, AP capability characteristics of the MAP, energy needs of the MAP, incentives that the vehicle (or operator thereof) is willing to accept, etc.

Upon receiving the request, the AP Positioning system (e.g., a central system, a local system, a distributed system including a central system and a local system, etc.) may then determine a parking location for the vehicle. Many examples of such determining are discussed herein (e.g., with regard to FIG. 9, FIG. 8, etc.). For example, when the AP Positioning System receives the request, it may solve an optimization problem (e.g., initiate the execution of the example method 900 of FIG. 9, etc.). For example, the AP Positioning system may maximize a function (or minimize a cost function) that can be defined according to the goals of the network. For example, if the goal is to maximize coverage, the AP Positioning System may suggest a parking location (or position) where the density of vehicles is the lowest (e.g., to increase or stabilize or guarantee Wi-Fi coverage, etc.).

Also for example, if the AP Positioning System tries to balance demand with offer (e.g., incentives and discussed herein, etc.), it may choose a location where the number of expected users per location is the highest (actual or anticipated). Previous feedback may, for example, be analyzed to avoid locations that are known to be bad. As discussed herein, feedback may also be used to understand demand over time and location. Upon making a parking recommendation (or extending an incentive offer for parking at a particular location), the AP Positioning System may for example temporarily lock the recommended or offered parking spot until receiving a confirmation (making the lock effective) or timing out, upon which time the AP Positioning System may search for other MAPs to extend the offer.

The AP Positioning System may then communicate the recommended parking location to the Mobile AP (or a portion thereof). Such communication may, for example, occur via any of the communication pathways discussed herein. As discussed herein, the recommended parking location may actually be a mandate or command. Also as discussed herein, the parking location recommendation may be communicated with an incentive for performing the requested parking. Additionally, the parking location recommendation may comprise information indicating a required and/or desired time window, communication capability expectations, instructions explaining whether or how to connect wirelessly or wired or tethered to the infrastructure, direction in which to point a directional antenna, etc.

In the example scenario 1000, the vehicle (or MAP thereof, operator thereof, etc.) has accepted the recommendation and proceeds to the recommended location. Note that as discussed herein, the location may be mandated, following the recommendation may be a contractual obligation, a negotiation between the driver (or vehicle) and the AP Positioning System may take place, etc. Note that in a scenario in which the vehicle is not going to park at the recommendation location, the vehicle (or MAP thereof, operator thereof, etc.) may request an alternative parking location, the vehicle may discontinue participation in the process, etc.

Upon arriving at the location, the MAP may provide feedback to the AP Positioning System. Such feedback may, for example, comprise an indication that the MAP (or vehicle) has arrived, an indication that the MAP has successfully established necessary communication links (e.g., wireless links to a FAP and/or to a cellular base station, Wi-Fi links to a customer, DSRC links to a FAP and/or another MAP, wired links to an infrastructure port, optical links to an infrastructure port, etc.), etc. Such feedback may, for example, comprise information characterizing a present networking environment (e.g., Wi-Fi activity amount, wireless signal medium assessment, signal strength and/or communication link quality with a FAP or another MAP or a cellular base station, communication channel noise, quality of service (QoS), etc.). For example, after arriving, identifying that the parking spot is free and/or successfully parking, etc., the vehicle (e.g., a MAP thereof, etc.) may evaluate the present networking environment, and such evaluation may continue throughout the vehicle's stay. In an example scenario, the vehicle may provide periodic feedback during the stay, may provide feedback upon request from the AP Positioning System, etc.

As discussed herein, a vehicle may refuse a parking recommendation or offer for any of a variety of reasons. An example reason is a determination by the vehicle (e.g., a MAP thereof, an operator thereof, a vehicle control system thereof, an AP Positioning System module thereof, etc.) that the current communication network environment is unacceptable (e.g., comprising one or more characteristics that measure below a threshold, etc.). For example, a refusal to accept a parking recommendation may be accompanied by information indicative of why the recommendation was refused (e.g., incentive too low, time demanded at location is too much, location is too far from a target location, communication environment is too poor, operator preference, preemption by another task, operator did not feel safe at location, etc.).

As discussed herein, the AP Positioning System (or other system) may utilize the feedback information to adapt a coverage model (e.g., a coverage or QoS map, etc.) that is used to manage the network (e.g., to plan node placement, to determine parking recommendations, etc.).

The MAP, now parked, may then for example, provide the desired service, for example as a Fixed AP. As discussed herein, the MAP may provide Wi-Fi service to users, multi-hop communication service to other MAPs and/or FAPs, multi-hop or single hop communication to a FAP and/or a cellular base station, etc.

During the vehicle's stay at a parking location, the vehicle may send a periodic message (e.g., a periodic heartbeat message, etc.) to indicate to the AP Positioning System (or other system) that the vehicle is still operating at the location. For example, the vehicle MAP may send a heartbeat message (e.g., a network packet, an in-band or out-of-band RF signal, etc.) every five minutes, every N minutes, etc. The AP Positioning System may also determine the vehicle's continued operation at the location in other manners, for example by monitoring the vehicle's location, monitoring the flow of packets flowing through the vehicle's MAP, etc. In a scenario in which the AP Positioning System (or other system) determines that the vehicle is no longer at (or functioning properly at) the parking location, the AP Positioning System may take remedial measures (e.g., attempting to contact the vehicle or driver thereof, attempting to find another vehicle to park at the location, etc.).

Upon completion of the MAP's stationary period (e.g., parking obligation, etc.) the MAP (or vehicle carrying the MAP) leaves the location, for example to continue its primary responsibilities as a transport vehicle, service vehicle, private vehicle, etc. Upon (or just before) leaving the location, the MAP may provide additional feedback, for example to the AP Positioning System, etc. Such feedback may comprise real-time networking information, for example as provided when the MAP first assessed the environment upon arriving and/or during the vehicle's stay at the parking location. Also for example, such feedback may comprise information characterizing the experience of the MAP during its stay at the location. For example, such feedback may comprise any of a variety of metrics, for example information characterizing the average Wi-Fi utilization during the stay, the average multi-hop bandwidth utilization due to other MAPs, the utilization of FAP connectivity, the utilization of cellular connectivity, the overall quality of the RF environment, number of users connected (e.g., as a function of time), number of Wi-Fi devices identified but which did not connect, amount of user traffic, amount of relayed traffic (e.g., multi-hop traffic, etc.), etc. As discussed herein, the feedback information provided by the MAP may be utilized by the AP Positioning System for model adjustment to determine the manner in which to deploy MAPs at fixed locations and/or times in the future.

Various aspects of the present disclosure also provide applications (e.g., Cloud-based applications, mobile-based applications, etc.) via which information about vehicle parking locations and general Wi-Fi coverage may be accessed. For example, users may utilize a mobile application that provides a map indicating where Wi-Fi coverage is being provided. Such a map may, for example, indicate whether a Wi-Fi coverage area is permanent and/or associated with a temporarily located parked vehicle. Such a map may, for example, indicate a timeframe associated with a temporary hotspot. Also, such a map may indicate future planned coverage areas, for example associated with vehicles that have been scheduled to park at particular locations. Note that such information may also be utilized by other access points of the network, for example in multi-hop scenarios. For example, the parked vehicle may provide DSRC communication services to other APs.

In an example implementation, a machine learning algorithm can process historical operational information about vehicle behavior to predict (or infer) various operational characteristics (e.g., how long a vehicle will take to get to a parking location, how long a vehicle will remain at the parking location providing Wi-Fi (or other) service, the likelihood of having Wi-Fi (or other) service at a given place/time, etc. For example, in an example implementation, information such as the location, time of day, day of the week/month/year, driver, vehicle, previous stops, previous locations, time stopped, weather conditions, and city events, among other factors, can be used to predict how much time a given vehicle will remain stopped. Also for example, in an example implementation, given the time of day, day of the week/month/year, number of active vehicles, vehicle locations, weather conditions, city events information, among other factors, the system can predict (or infer) the likelihood of a given place at a given time being covered by Wi-Fi or suggest a best time on a given day to be at a given location, and/or identify the best places to be on a given day and time.

Figure 11:
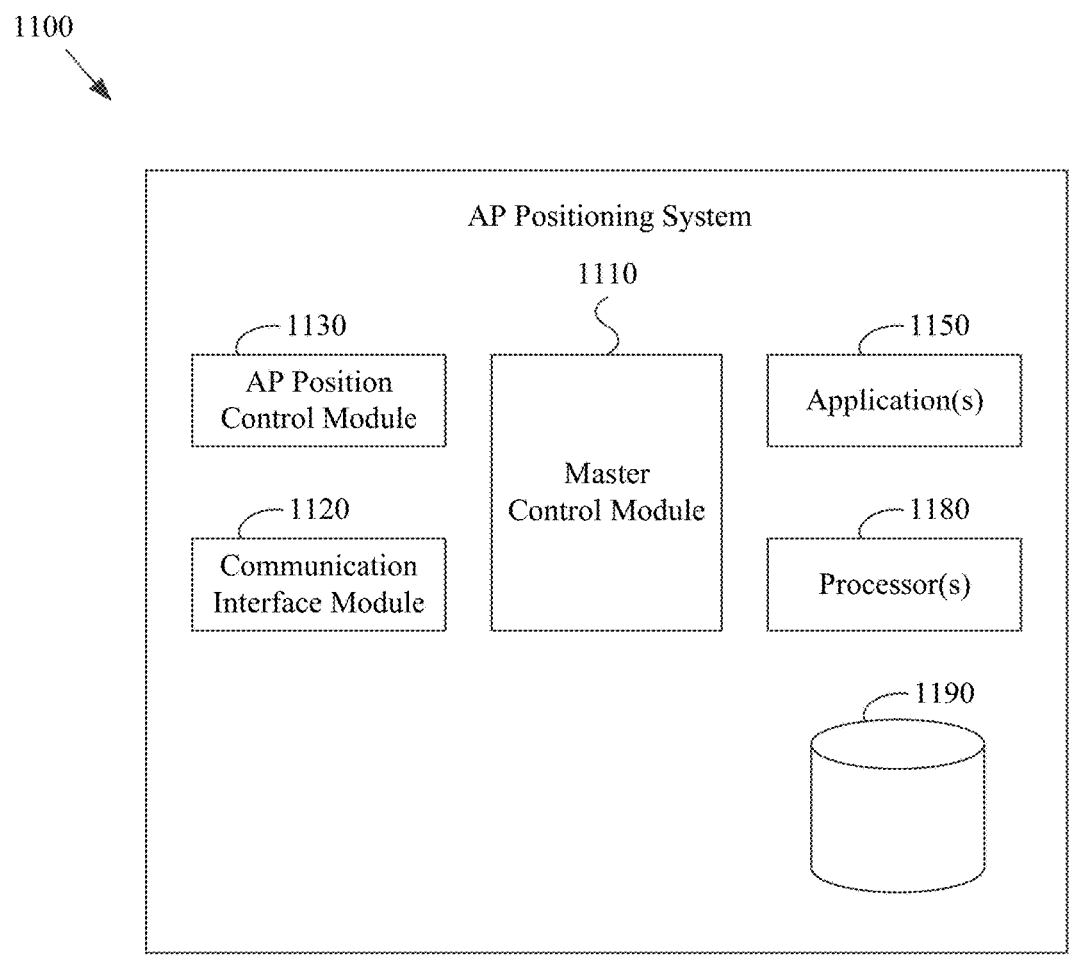
FIG. 11 shows a block diagram of an example AP Positioning System, in accordance with various aspects of the present disclosure.

FIG. 11 shows a block diagram of an example AP Positioning System, in accordance with various aspects of the present disclosure. The example AP Positioning System 1200 may, for example, share any or all characteristics with the other example methods, nodes, networks, and/or network components 100, 200, 300, 400, 500-570, 600, 700, 800, 900, 1000, and 1200, shown and/or discussed herein. For example, any or all of the components of the example AP Positioning System 1100 may perform any or all of the method steps presented herein (e.g., of the method 900 of FIG. 9, of the method 1000 of FIG. 10, etc.). As discussed herein, although the example AP Positioning System 1100 is presented here in the context of a central (e.g., cloud-based) controller (or server or NOC), it should be understood that any or all aspects of the example AP Positioning System 1100 may be implemented in any (or any combination) of the nodes discussed herein. For example, in an example implementation, the example AP Positioning System 1100 may be implemented in a distributed manner among the Mobile APs and/or Fixed APs and/or Cloud servers of the vehicle network.

The example AP Positioning System 1100 may, for example, comprise a Communication Interface Module 1120 that operates to perform any or all of the wireless and/or wired and/or optical tethered communication functionality for the example AP Positioning System 1100, many examples of which are provided herein (e.g., communication with databases, communication with shipping control systems, communication with fleet controllers, communication with Fixed AP nodes, communication with Mobile AP nodes, communication with cellular (or other) base stations, landline communication, communication with the Cloud APIs or other entities, backhaul communication, communication with client dashboards or controllers, communication with shipping container sensors, communication with sensors in general, etc.). The Communication I/F Module 1120 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), POTS communication, etc. For example, any of the example communication discussed herein between a CSC and a Mobile AP, between a CSC and a Fixed AP, between a CSC and a backhaul network, between a CSC and a local service controller, etc., may be performed utilizing the Communication I/F Module 1120.

The example AP Positioning System 1100 also comprises an AP Position Control Module 1130 that, for example, performs any or all of the AP (or vehicle) position control functionality discussed herein (e.g., with regard to the example method 900 of FIG. 9, with regard to the example method 1000 of FIG. 10, etc.). The AP Position Control Module 1130 may, for example, utilize communication services provided by the Communication Interface Module 1120 to perform various aspects of communication.

The example AP Positioning System 1100 may, for example, comprise a Master Control Module 1110 that generally manages operation of the AP Positioning System 1100 at a high level. Such Master Control Module 1110 may, for example, comprise various aspects of an operating system for the AP Positioning System 1100.

The example AP Positioning System 1100 may further, for example, comprise one or more Applications 1150 executing on the AP Positioning System 1100 (e.g., network performance analyzing application, parking control applications, sensor interface applications, road maintenance control applications, mass transit control applications, traffic control applications, client management applications, security applications, power management applications, vehicle monitoring applications, location services applications, user interface applications, etc.).

The example AP Positioning System 1100 may also comprise one or more Processors 1180 and Memory Devices 1190. The Processor(s) 1180 may, for example, comprise any of a variety of processor characteristics. For example, the Processor(s) 1180 may comprise one or more of a general purposes processor, RIS processor, microcontroller, ASIC, DSP, video processor, co-processor, etc.). The Memory Device(s) 1190 may, for example comprise any of a variety of memory characteristics. For example, the Memory Device(s) 1190 may comprise a volatile memory, non-volatile memory, etc. The Memory Device(s) 1190 may, for example, comprise a non-transitory computer-readable medium that comprises software instructions that when executed by the Processor(s) 1180, cause the AP Positioning System 1100 to perform any or all of the functionality discussed herein (e.g., parking control functionality, mobility management functionality, communication functionality, etc.).

Figure 12:
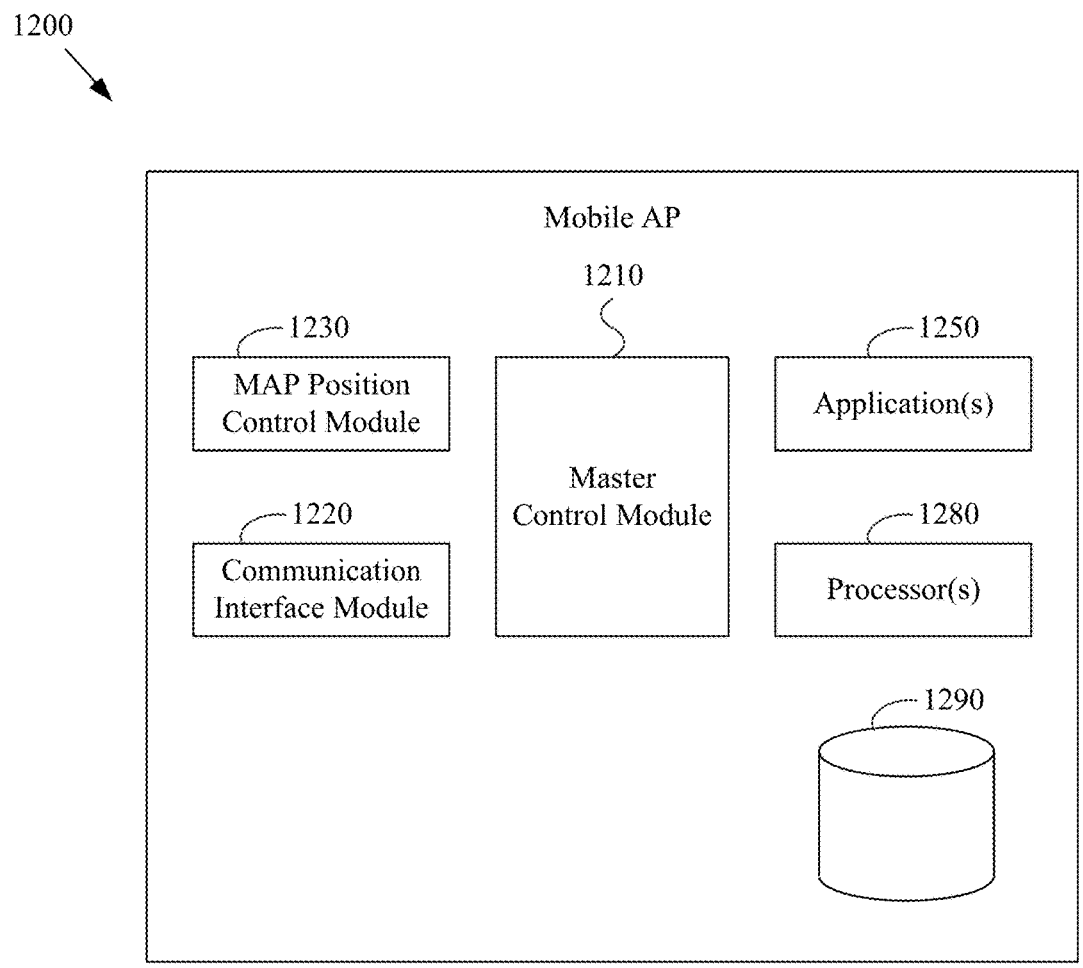
FIG. 12 shows a block diagram of an example mobile access point, in accordance with various aspects of the present disclosure.

FIG. 12 shows a block diagram of an example mobile access point, in accordance with various aspects of the present disclosure. The example Mobile AP 1200 may, for example, share any or all characteristics with the other example methods, nodes, networks, and/or network components 100, 200, 300, 400, 500-570, 600, 700, 800, 900, 1000, and 1100, shown and/or discussed herein. For example, any or all of the components of the example Mobile AP 1200 may perform any or all of the method steps presented herein, for example with regard to a Mobile AP, with regard to the example method 900 of FIG. 9, with regard to the example method 1000 of FIG. 10, etc. Note that the Mobile AP 1200 may also be referred to herein as an OBU.

The example Mobile AP 1200 may, for example, comprise a Communication Interface Module 1220 that operates to perform any or all of the wireless and/or wired communication functionality for the Mobile AP 1200, many examples of which are provided herein (e.g., communication with AP Positioning Systems, communication with Cloud databases, communication with sensors, communication with local shipping control or navigation systems of vehicles or Mobile APs, communication with NCs, communication with Fixed AP nodes, communication with Mobile AP nodes, communication directly with client devices, backhaul or cellular communication, etc.). The Communication I/F Module 1220 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), etc. For example, any of the example communication discussed herein between a Mobile AP and a shipping container, between a Mobile AP and an NC, between a Mobile AP and a Fixed or Mobile AP, between a Mobile AP and a local shipping control system (or module), between a Mobile AP and a Cloud database, between a Mobile AP and a Central Shipping Controller, etc., may be performed utilizing the Communication Interface Module 1220.

The example Mobile AP 1200 also comprises a MAP Position Control Module 1230 that, for example, operates to perform any or all of the MAP (or vehicle) position control functionality (e.g., including sensor data collection, analysis, communication, etc.; the communication of control information; etc.) discussed herein (e.g., with regard to the example method 900 of FIG. 9, with regard to the example method 1000 of FIG. 10, etc.). The MAP Position Control Module 1230 may, for example, utilize communication services provided by the Communication Interface Module 1220 to perform various aspects of communication.

The example Mobile AP 1200 may, for example, comprise a Master Control Module 1210 that generally manages operation of the Mobile AP 1200 at a high level. Such Master Control Module 1210 may, for example, comprise various aspects of an operating system for the Mobile AP 1200.

The example Mobile AP 1200 may further, for example, comprise one or more Applications 1250 executing on the Mobile AP 1000 (e.g., MAP or vehicle position control applications, sensor interface applications, client management applications, security applications, power management applications, vehicle monitoring applications, location services applications, user interface applications, etc.).

The example Mobile AP 1200 may also comprise one or more Processors 1280 and Memory Devices 1290. The Processor(s) 1280 may, for example, comprise any of a variety of processor characteristics. For example, the Processor(s) 1280 may comprise one or more of a general purpose processor, RIS processor, microcontroller, ASIC, DSP, video processor, co-processor, etc. The Memory Device(s) 1290 may, for example comprise any of a variety of memory characteristics. For example, the Memory Device(s) 1290 may comprise a volatile memory, non-volatile memory, etc. The Memory Device(s) 1290 may, for example, comprise a non-transitory computer-readable medium that comprises software instructions that when executed by the Processor(s) 1280, cause the Mobile AP 1200 to perform any or all of the functionality discussed herein (e.g., MAP or vehicle position control functionality, sensor interface functionality, mobility management functionality, communication functionality, user interface functionality, etc.).

Note that the example Mobile AP 1200 may also be a Fixed AP (or base station), in which case, the modules operate to perform any or all of the functionality discussed herein with regard to Fixed APs and/or base stations. For example, as discussed herein, a vehicle comprising a Mobile AP may be parked and perform one or more of the functions of a Fixed AP. Also note that the example Mobile AP 1200 may be implemented in any of the communication network nodes discussed herein (e.g., Cloud nodes, backbone network nodes, vehicle network nodes, client or user devices, etc.).

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. patent application Ser. No. 15/191,732, titled "Systems and Methods for Managing Mobility in a Network of Moving Things," filed on Jun. 24, 2016, which claims priority to U.S. Provisional Application Ser. No. 62/222,098, titled "Systems and Methods for Managing Mobility in a Network of Moving Things," filed on Sep. 22, 2015, each of which is hereby incorporated herein by reference in its entirety for all purposes.

Also, in accordance with various aspects of this disclosure, the networks and/or components thereof presented herein are provided with systems and methods for managing connectivity in such networks and/or components, non-limiting examples of which are provided in U.S. patent application Ser. No. 15/245,992, titled "Systems and Methods for Managing Connectivity in a Network of Moving Things," filed on Aug. 24, 2016 and U.S. Provisional Application Ser. No. 62/222,121, titled "Systems and Methods for Managing Connectivity in a Network of Moving Things," filed on Sep. 22, 2015, each of which is hereby incorporated herein by reference in its entirety for all purposes.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. patent application Ser. No. 15/352,979, titled "Systems and Methods for Managing Network Controllers and Their Network Interactions in a Network of Moving Things, for Example Including a Network of Autonomous Vehicles," filed on Nov. 16, 2016, which claims priority to U.S. Provisional Patent Application Ser. No. 62/273,715, filed on Dec. 13, 2015, and titled "Systems and Methods for Managing Mobility Controllers and Their Network Interactions in a Network of Moving Things," each of which is hereby incorporated herein by reference in its entirety for all purposes.

Still further, in accordance with various aspects of this disclosure, the networks and/or components thereof presented herein are provided with systems and methods for managing and/or triggering handovers of mobile access points, non-limiting examples of which are provided in U.S. patent application Ser. No. 15/352,953, titled "Systems and Methods for Managing and Triggering Handovers of Mobile Access Points in a Network of Moving Things, for Example Including a Network of Autonomous Vehicles," filed on Nov. 16, 2016, which claims priority to U.S. Provisional Patent Application Ser. No. 62/281,432, filed on Jan. 21, 2016, and titled "Systems and Methods for Managing and Triggering Handovers of Mobile Access Points in a Network of Moving Things," each of which is hereby incorporated herein by reference in its entirety for all purposes.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide systems and methods for utilizing mobile access points as fixed access points in a network of moving things, for example including autonomous vehicles. As non-limiting examples, various aspects of this disclosure provide systems and methods for strategically positioning mobile access points at fixed locations, for example to flexibly augment the capabilities of the vehicle communication network. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A mobile access point (MAP) positioning system of a vehicle communication network, where the vehicle communication network comprises a plurality of fixed access points (FAPs) and a plurality of mobile access points (MAPs), the MAP positioning system comprising:
at least one module comprising a processor and memory, and being operable to, at least:
monitor operating conditions of the vehicle communication network;
monitor a location of each of the plurality of MAPs;
determine, based at least in part on the monitored operating conditions and the monitored locations, to deploy a first MAP of the plurality of MAPs as a FAP at a fixed location; and
deploy the first MAP to the fixed location to provide FAP services.

2. The MAP positioning system of claim 1, wherein the at least one module is operable to deploy the first MAP to the fixed location to provide FAP services by, at least in part, operating to communicate navigation information to the first MAP to guide a vehicle.

3. The MAP positioning system of claim 1, wherein the at least one module is operable to determine, for each MAP of the plurality of MAPs, a respective capability to provide FAP services, and determine to deploy the first MAP to the fixed location based at least in part on the respective capability of the first MAP.

4. The MAP positioning system of claim 1, wherein the at least one module is operable to determine, for each MAP of the plurality of MAPs, an availability to provide FAP services, and determine to deploy the first MAP to the fixed location based at least in part on the respective availability of the first MAP.

5. The MAP positioning system of claim 1, wherein the first MAP is associated with a respective vehicle having a respective primary purpose that is unrelated to providing communication services.

6. The MAP positioning system of claim 1, wherein the at least one module is operable to determine to deploy the first MAP to the fixed location to provide FAP services based, at least in part, on a request to release a second MAP from currently providing FAP services.

7. The MAP positioning system of claim 1, wherein the at least one module is operable to determine to deploy the first MAP to the fixed location to provide FAP services based, at least in part, on historical FAP service needs.

8. The MAP positioning system of claim 1, wherein the at least one module is operable to deploy the first MAP to the fixed location to provide FAP services by, at least in part, operating to communicate navigation information to an autonomous vehicle control system of an autonomous vehicle carrying the first MAP.

9. A mobile access point (MAP) positioning system of a vehicle communication network, where the vehicle communication network comprises a plurality of fixed access points (FAPs) and a plurality of mobile access points (MAPs), the MAP positioning system comprising:
at least one module comprising a processor and memory, and being operable to, at least:
gather information;
analyze the gathered information to determine whether to deploy a MAP of the plurality of MAPs as a FAP at a fixed location;
if it is determined to deploy the MAP as a FAP at the fixed location, then at least:
determine a vehicle parking plan for a vehicle carrying the MAP; and
interact with the MAP, the vehicle, and/or a driver of the vehicle to deploy the MAP as a FAP at the fixed location.

10. The MAP positioning system of claim 9, wherein the gathered information comprises information of current vehicle communication network conditions and information of historical vehicle communication network conditions.

11. The MAP positioning system of claim 9, wherein the gathered information comprises information describing the vehicle carrying the MAP and/or information describing a status of the vehicle carrying the MAP.

12. The MAP positioning system of claim 9, wherein the gathered information comprises information identifying an owner of the vehicle.

13. The MAP positioning system of claim 9, wherein the at least one module is operable to gather the information by, at least in part, operating to gather at least a portion of the information from the MAP.

14. The MAP positioning system of claim 9, wherein the at least one module is operable to determine the vehicle parking plan based, at least in part, on a map of presently available places to park.

15. The MAP positioning system of claim 9, wherein the at least one module is operable to determine the vehicle parking plan based, at least in part, on respective communication services available at each of a plurality of parking locations.

16. The MAP positioning system of claim 9, wherein the at least one module is operable to interact with the MAP, the vehicle, and/or a driver of the vehicle by, at least in part, operating to communicate navigation information to the first MAP to guide the vehicle carrying the MAP to the fixed location.

17. A mobile access point (MAP) comprising:
at least one module comprising a processor and memory, and being operable to, at least:
provide mobile access point (MAP) services;
provide fixed access point (FAP) services;
during normal MAP operation:
provide MAP services while the MAP is moving, wherein the MAP services comprise providing wireless local area network (WLAN) services;
while providing the MAP services, determine to provide FAP services at a fixed location; and
provide the FAP services at the fixed location,
wherein the at least one module is operable to determine to provide FAP services at the fixed location by, at least in part, operating to:
solicit, from a MAP positioning system, a deployment to provide FAP services; and
receive, from the MAP positioning system, information directing the MAP to provide the FAP services at the fixed location.

18. The MAP of claim 17, wherein the at least one module is operable to, while providing the FAP services at the fixed location, determine to move from the fixed location and resume normal MAP operation.

19. The MAP of claim 17, wherein the MAP is associated with a respective vehicle having a respective primary purpose that is unrelated to providing communication services.

20. The MAP of claim 17, wherein the MAP comprises a port for connection to a wired and/or tethered communication medium, and the FAP services comprise providing communication to a back-end network via the wired and/or tethered communication medium.

21. The MAP of claim 17, wherein the at least one module is operable to determine to provide FAP services at the fixed location by, at least in part, operating to negotiate incentives with a MAP positioning system.

22. The MAP of claim 17, wherein the at least one module is operable to determine to provide FAP services at the fixed location based, at least in part, on navigational information received from a MAP positioning system.

23. The MAP of claim 17, wherein the at least one module is operable to provide feedback information to a MAP positioning system concerning operation of the MAP at the fixed location.

24. The MAP of claim 20, wherein the port is for direct connection of a wire and/or tether to the MAP.

\* \* \* \* \*